US007103479B2

(12) United States Patent
Patwardhan et al.

(10) Patent No.: US 7,103,479 B2
(45) Date of Patent: Sep. 5, 2006

(54) METHOD AND SYSTEM FOR EVALUATING WATER USAGE

(75) Inventors: Avinash S. Patwardhan, Wellington, FL (US); Jared N. Thorpe, Gainesville, FL (US); Muzaffar Eusuff, Redding, CA (US); Greg Norby, Redding, CA (US)

(73) Assignee: CH2M Hill, Inc., Englewood, CO (US)

( * ) Notice: Subject to any disclaimer, the term of this patent is extended or adjusted under 35 U.S.C. 154(b) by 28 days.

(21) Appl. No.: 11/036,414

(22) Filed: Jan. 14, 2005

(65) Prior Publication Data

US 2005/0246102 A1 Nov. 3, 2005

Related U.S. Application Data

(60) Provisional application No. 60/567,319, filed on Apr. 30, 2004.

(51) Int. Cl.
*G06Q 50/00* (2006.01)
(52) U.S. Cl. .................... 702/2; 702/5; 702/12
(58) Field of Classification Search .............. 702/2–5, 702/12, 13
See application file for complete search history.

(56) References Cited

U.S. PATENT DOCUMENTS 5,448,476 A * 9/1995 Kurokawa et al. ............ 702/2
6,862,528 B1 * 3/2005 Scannell ..................... 702/3
6,947,842 B1 * 9/2005 Smith et al. ................. 702/3
2002/0055820 A1 * 5/2002 Scannell ..................... 702/3
2003/0093236 A1 * 5/2003 Wu et al. .................... 702/85

FOREIGN PATENT DOCUMENTS

WO  WO 99/39567  8/1999

OTHER PUBLICATIONS

"Boss ARSP Comprehensive Water Resource Simulation Model," BOSS International, undated, 1 page, no date.
"ARSP Technical Information Concept of ARSP," BOSS International, 2004, 4 pages http://www.bossintl.com/html/arsp_tech_info.html [accessed Jul. 11, 2005].
"ARSP Technical Information Network Programming Formulation," BOSS International, 2004, 3 pages http://www.bossintl.com/html/arsp_tech_info_—_page_2.html [accessed Jul. 11, 2005].

* cited by examiner

*Primary Examiner*—Donald McElheny, Jr.
(74) *Attorney, Agent, or Firm*—Perkins Coie, LLP

(57) ABSTRACT

An evaluation system models water usage within a region. The evaluation system provides a graphical representation of various water system components. Each water system component has a model describing its water balance and parameters for customizing the model for an instance of the water system component. The evaluation system receives indications of water system components within the region along with connections between the water system components. The evaluation system receives values for parameters of the water system components. The evaluation system then calculates the water demand of the region by calculating the water balance of each water system component within the region based on the models for each water system component and the connections between the water system components. The evaluation system provides a cost-effective solution to manage water usage within the region.

23 Claims, 19 Drawing Sheets

410

420

430

LATERAL

440

450

RICE FIELDS

460

OTHER CROPS

470

GROUNDWATER

480

REUSE

METHOD AND SYSTEM FOR EVALUATING WATER USAGE

CROSS-REFERENCE TO RELATED APPLICATION(S)

This application claims the benefit of U.S. Patent Application No. 60/567,319 entitled "METHOD AND SYSTEM FOR EVALUATING WATER USAGE," filed on Apr. 30, 2004, which application is incorporated by reference herein in its entirety.

TECHNICAL FIELD

The described technology relates to analyzing and optimizing of water supply and demand in a water usage region of a watershed.

BACKGROUND

In many water use environments, water users would like to optimize various water usage criteria. For example, in an agricultural environment, a farmer may want to irrigate a field to maximize profit by decreasing water cost and increasing crop yield. As another example, a golf course owner may want to increase water use efficiency to minimize the course's demand for water and still keep an acceptable turf quality. To optimize water usage, a water user needs to be aware of the various factors that can affect the costs and efficiency of water usage. For example, the cost of water may increase during the summer months when supply is short. In such a case, a farmer may want to irrigate a field just before the summer months begin.

To optimize overall water usage of a region, the needs of many different water users may need to be considered. For example, if a region has different farm and non-farm water uses with different water demands that vary over time, then the optimization of water usage for the region should consider all the demands on the supply. In addition, the water usage of one water user may affect the water usage of another water user. For example, if a farmer places a high demand on water of a certain supply during a certain time period, then a downstream farmer may not be able to satisfy their demand from that same supply or an ecosystem demand to maintain minimum flows and levels may be violated.

It is currently difficult to assess and evaluate the various water usage supply and demand options. It would be desirable to have an effective way to analyze water supply and demand to optimize water usage criteria such as water cost and water use efficiency.

BRIEF DESCRIPTION OF THE DRAWINGS

FIG. 15 illustrates the setting of parameters for a non-rice crop field.

FIG. 17 illustrates the setting of parameters relating to the optimization.

DETAILED DESCRIPTION

Figure 1:
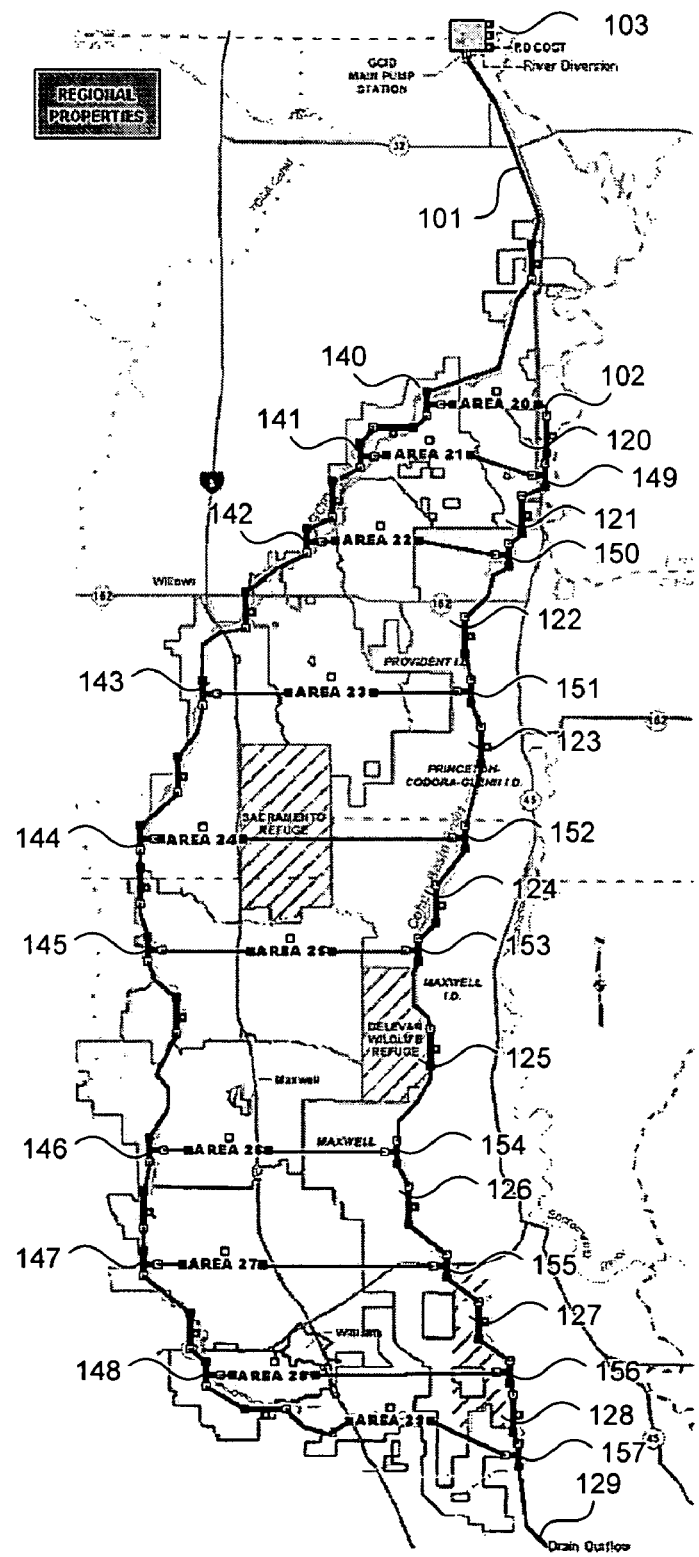
FIG. 1 is a diagram that illustrates the various system operating units within a region in one embodiment.

A method and system for evaluating water usage by water users is provided. In one embodiment, the evaluation system models water usage within a region. The evaluation system provides a graphical representation of various types of water system components. Each water system component (e.g., well or field) has a model describing its water balance and parameters for customizing the model for an instance of the water system component. The evaluation system receives indications of water system components within the region along with connections between the water system components. For example, the water output of a well is connected to the water input of a canal. The evaluation system then displays a graphical representation of the water system components along with their connections. The evaluation system receives values for parameters of the models of the water system components. For example, a parameter for a well may specify maximum pump rate. The evaluation system then calculates the water demand of the region by calculating water demand effects of various water system components within the region based on the model of water system components and their interconnections. The evaluation system may also optimize a water usage criterion based on varying parameters of the water system components while satisfying constraints of water usage. For example, the water usage criterion may be to minimize draw from a certain water source.

In one embodiment, the evaluation system evaluates water usage within a region, which may include many different system operating units ("SOUs"), to optimize various water usage criteria such as cost or water use efficiency. A system operating unit places a water demand upon the water supply of the region. For example, a system operating unit may correspond to multiple contiguous agricultural fields with different crops. Each region may have one or more main water sources that supply water to all the system operating units within the region via a main channel (e.g., a canal). The main water source of a region can come from various water sources such as rivers, lakes, reservoirs, and so on. In addition, each system operating unit may have its own water source, for example, groundwater from a well or drainwater from a field that is available for reuse. The evaluation system allows a user to define the relationships between various water system components (e.g., water sources, conveyances, channels, and fields) within a system operating unit and between system operating units. For example, a system operating unit that includes a rice field may have drainwater that can be channeled to another field for reuse. In such a case, the evaluation system allows a user to define the parameters of the fields along with a channel between them. The evaluation system allows a user to define parameters (e.g., demand and evapotranspiration) of the water system components. The specification of the water system components, including their parameters and relationships, is referred to as a "water usage design" of the region. The evaluation system uses a mathematical model of the water system components to identify the amount of water to be supplied to satisfy an overall water usage goal. The water usage goal may be to minimize the water cost, to maximize water use efficiency, and so on. The evaluation system allows a user to analyze various water supply and demand scenarios in order to satisfy their overall water usage goal.

In one embodiment, the evaluation system allows a user to define a graphical representation of a region and its various system operating units. The evaluation system provides icons representing various water system components such as system operating units, channels, water sources, water reuse opportunities, fields, and so on. The evaluation system allows the user to specify the interconnection of the water system components within a region. For example, a user may define a system operating unit to include a rice field and a wheat field. The user may specify a channel through which drainwater can flow from the rice field to the wheat field where it is available for reuse. The user may also specify that a certain percentage of the drainwater from the rice field is available to be pumped and reused on the rice field. The evaluation system allows the user to specify various parameters of the water system components. For example, each water supply may have a supply amount and associated cost, which may be defined for each time period such as a week. Each water system component may have a formula that defines its outputs based on inputs. For example, a rice field with an input of 100,000 gallons of water per week may have an output of 25,000 gallons of water for reuse during that same week.

The evaluation system also allows a user to specify an objective function whose value represents the water usage criteria that are to be optimized. For example, a user may specify an objective function that indicates that the overall cost of water should be minimized. The evaluation system also allows a user to specify various constraints to be used when optimizing the objective function. For example, one constraint may be that a certain well cannot be used during a certain time period. The evaluation system attempts to optimize the objective function given the constraints and the relationships that define the water system components. The evaluation system can provide a visual representation of the water usage over time.

After a region is defined, the evaluation system may run a water balance model without use of alternative water sources. From this, the evaluation system establishes water demands and drainwater flows for the complete season. After the water usage is balanced, the evaluation system can be used to optimize a water usage criterion. For example, a user may define alternative water sources along with their respective costs. When an optimization is initiated, the evaluation system may apply a simplex optimization algorithm to solve the objective function. In one embodiment, each time period is independent of other time periods. As a result, the evaluation system can perform the optimization for each time period without having to factor in the optimization effects of another time period. The evaluation system can then extract flow rates from the various alternative sources from the solution and add them to the model.

Once a completed set of water supply flow rates for the optimum solution is established for the whole season, the evaluation system can put this data into the water balance model. If the model is then run, the optimum solution can be verified and the optimum water balance can be observed in operation.

FIG. 1 is a map of the various system operating units within a region and the channels that connect the system operating units to a water source in one embodiment. A region 100 is defined to include areas 120–129 that each correspond to a system operating unit. The region includes main channels 101 and 102. Water flows from water source 103 through main channel 101. Water is diverted from main channel 101 to system operating units 120–129 via junctions 140–148 and supplied from system operating units 120–129 to main channel 102 via junctions 149–157.

Figure 2:
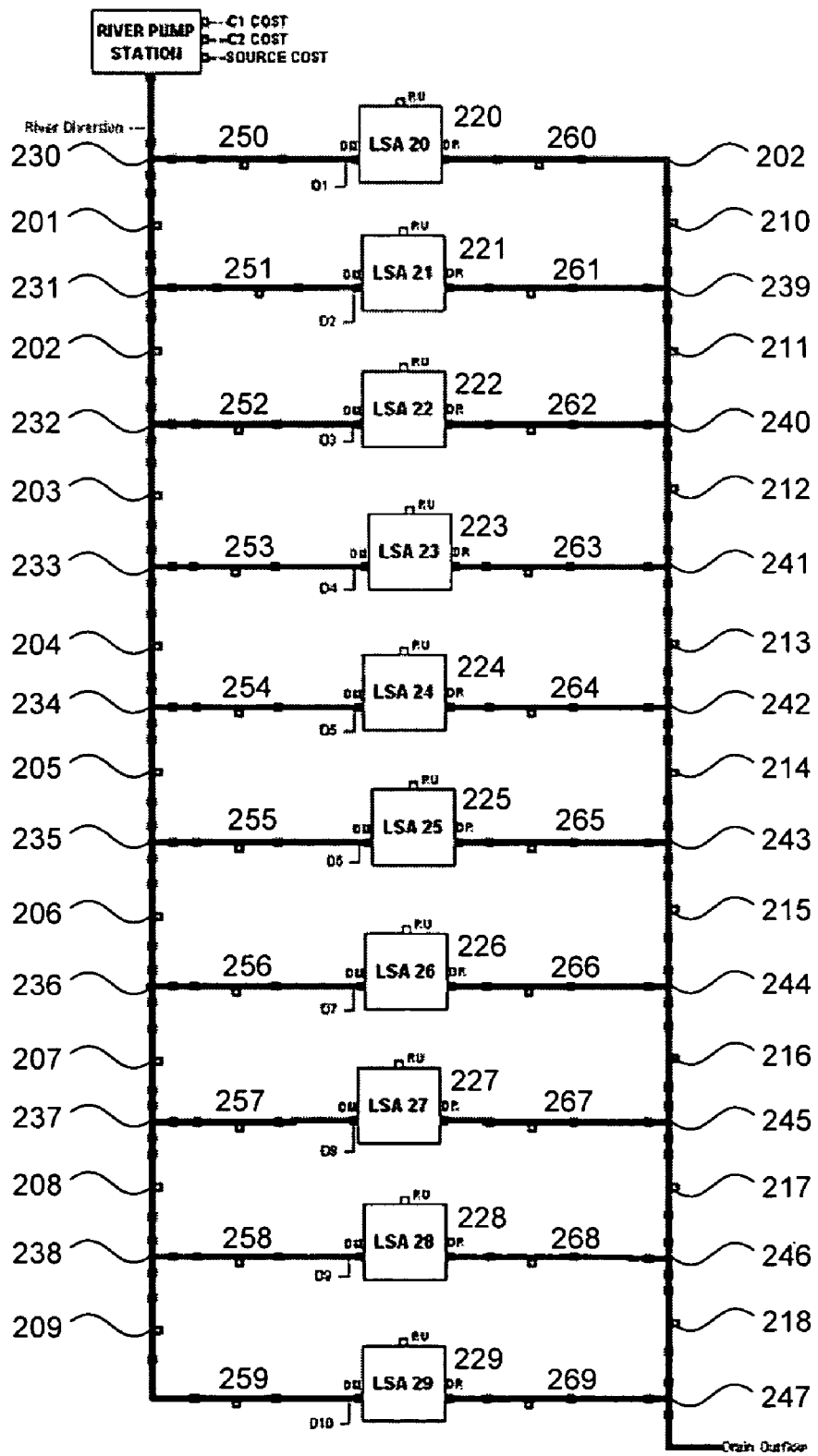
FIG. 2 is a block diagram that illustrates the channels between the system operating units in one embodiment.

FIG. 2 is a graphical representation of the use of various icons that represent system operating units and water system components to model a region. System operating unit icons 220–229 correspond to system operating units 120–129 of FIG. 1, main channel icons 201–218 correspond to main channels 101 and 102 of FIG. 1, and junction icons 230–247 correspond to junctions 140–157 of FIG. 1. The lateral channel icons 250–269 between the system operating unit icons 220–229 and the junction icons 230–247 represent the lateral flows from and to the main channels 101 and 102 of FIG. 1. Each of the system operating unit icons 220–229 graphically represents a system operating unit and may have input and output ports representing connections for the inflows and outflows of water to and from the system operating unit.

Figure 3:
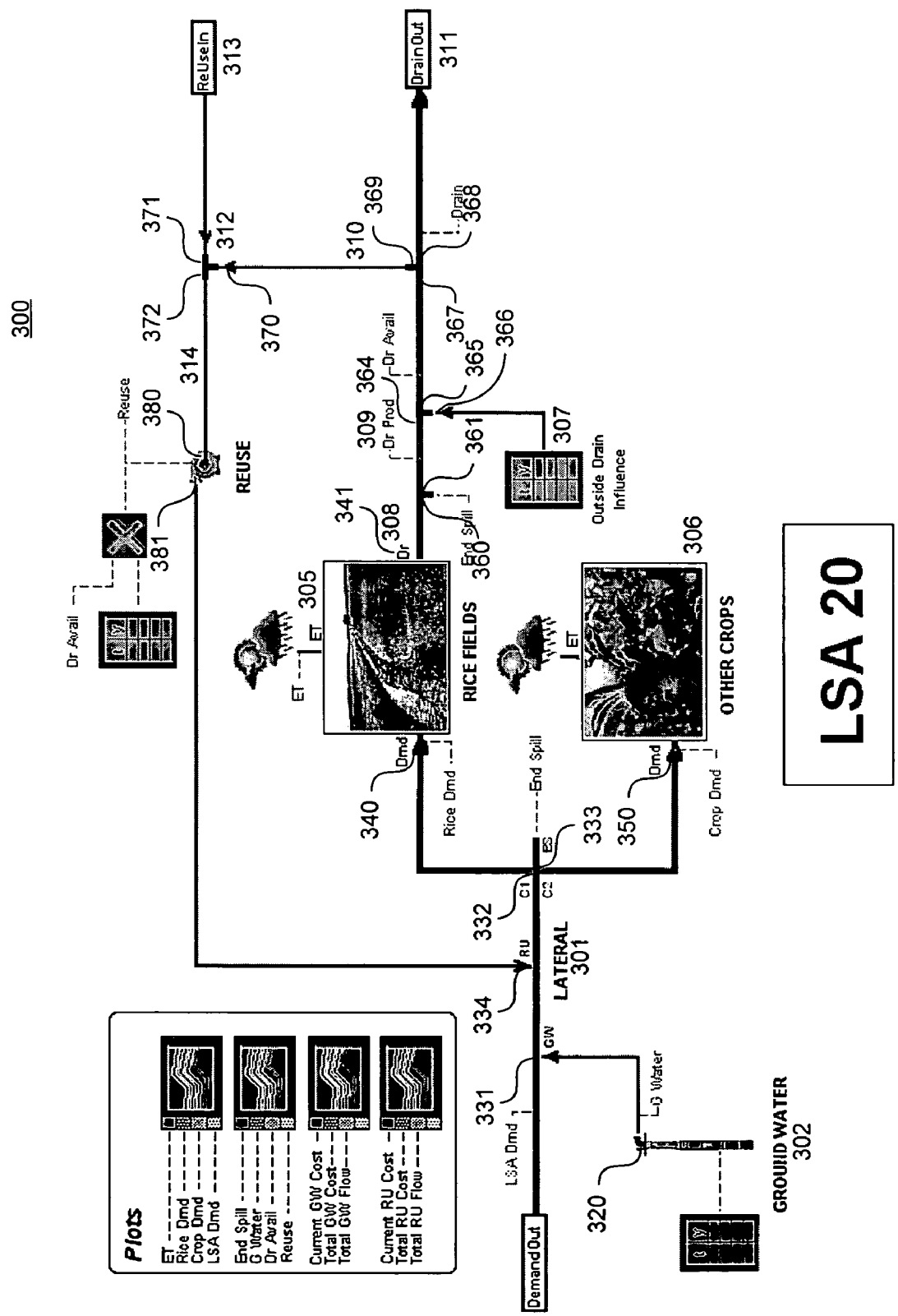
FIG. 3 is a block diagram that illustrates a specification of a system operating unit in one embodiment.

FIG. 3 is a block diagram that illustrates using icons that represent water system components to model a system operating unit in one embodiment. The system operating unit 300 (corresponding to system operating unit 120 of FIG. 1 and system operating unit icon 220 of FIG. 2) includes a rice field and another crop field represented by rice field icon 305 and other crops field icon 306. The system operating unit 300 is connected to main channel 101 via a lateral channel represented by lateral channel icon 301. The lateral channel is also fed water via a groundwater source represented by groundwater icon 302. The feeding of water from the groundwater source to the lateral channel is represented graphically by connection of the groundwater connector 320 of groundwater icon 302 to the groundwater connector 331 of lateral channel icon 301. The lateral channel feeds water to the rice field and the other crops field, which is represented graphically by connection of the generic connectors 332 and 333 of lateral channel icon 301 to the water demand connectors 340 and 350 of the rice field icon 305 and the other crops field icon 306. The rice field has drainwater that travels to main channel 102, which is graphically represented by the connection of the drainwater connector 341 of the rice field icon 305 to the drain icon 311 via connecting the various inflow connectors 360, 364, and 367 and outflow connectors 361, 365, and 368 of junction icons 308, 309, and 310 to each other and to the drainwater connector 341 and the drain icon 311. The flow of drainwater to the main channel 102 is influenced by an outside drain, which is graphically represented by connecting an outside drain influence icon 307 to the junction connector 366 of junction icon 309. The drainwater from the rice field is partially diverted via a junction for reuse before entering main channel 102, which is graphically represented by connecting junction connector 369 of junction icon 310 to inflow connector 380 of reuse pump icon 314 via the connection of junction connector 369 of junction icon 310 to junction connection 370 of junction icon 312 and the connection of outflow connector 372 of junction icon 312 to inflow connector 380 of reuse pump icon 314. The reuse water from another system operating unit flows from main channel 102 and combines with the drainwater diverted for reuse, which is graphically shown by the connection of reuse icon 313 to inflow connector 371 of junction icon 312. The combined reuse water is pumped back into the lateral channel for reuse, which is graphically shown by connection of reuse connector 381 of reuse pump icon 314 to reuse connector 334 of lateral channel icon 301.

Figure 4:
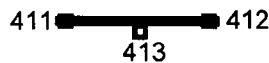
FIG. 4 illustrates icons that represent the various water system components in one embodiment.
Figure 4:
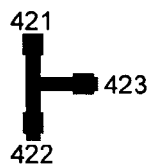
Figure 4:
Figure 4:
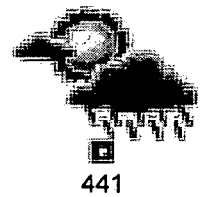
Figure 4:
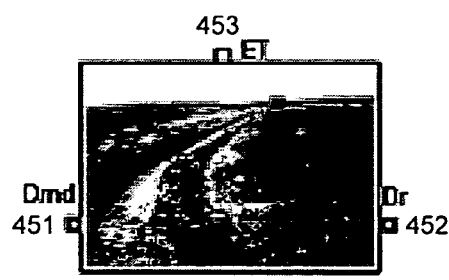
Figure 4:
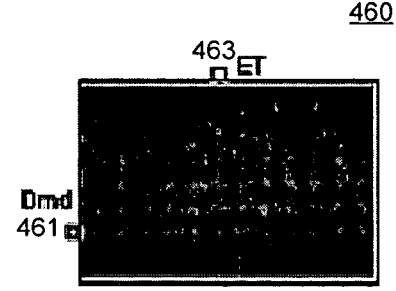
Figure 4:
Figure 4:
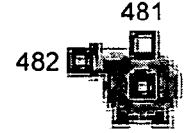

FIG. 4 illustrates icons that represent the various water system components, such as main channels, junctions, lateral channels, water sources, pumps, and crop fields, in one embodiment. The icon for each water system component may contain one or more of the following connectors: an inflow connector, an outflow connector, a lateral connector, a junction connector, a generic connector, an evapotranspiration connector, a reuse connector, a water demand connector, a drainwater connector, a groundwater supply connector, and other user-created connectors. These connectors for the icons allow the various water system components, as represented graphically by the respective icons for the components, to be connected graphically to each other.

In general, an inflow connector for one water system component's icon may be connected to an outflow connector, a junction connector, a drainwater connector, or a generic connector of another water system component's icon. Similarly, an outflow connector for one water system component's icon may be connected to the inflow connector, a junction connector, a water demand connector, or a generic connector of another water system component's icon. For example, an inflow connector 411 for a main channel icon 410 could be connected to the outflow connector 412 of another main channel icon 410 or it could be connected to the inflow connector 421 or junction connector 423 of a junction icon 420.

Some connectors for an icon are intended to be connected to the same connector of another icon. For example, the evapotranspiration connector 441 of the evapotranspiration icon 440 could be connected to the evapotranspiration connector 453 of the rice field icon 450. Similarly, the groundwater connector 471 of groundwater source icon 470 could be connected to the groundwater connector 433 of lateral channel icon 430, and the reuse connector 482 of reuse icon 480 could be connected to the reuse connector 434 of lateral channel icon 430. Although, in the embodiment shown in FIG. 4, the evapotranspiration icon 440 and the rice field icon 450 each have an evapotranspiration connector, the evapotranspiration connector 441 of the evapotranspiration icon 440 and the evapotranspiration connector 453 of the rice field icon 450 could be specified as a different kind of connector, such as a generic connector, in other embodiments. An advantage of specifying an evapotranspiration connector for the evapotranspiration icon 440 and rice field icon 450 rather than a generic connector, however, is that it helps the user connect one icon to another appropriate icon when modeling an area with the icons.

The main channel component, which is graphically represented by main channel icon 410, represents a main channel or canal in a water system. The main channel icon 410 includes an inflow connector 411, an outflow connector 412, and a lateral connector 413. A junction component, which is graphically represented by junction icon 420, represents a junction in a water system. The junction icon 420 includes an inflow connector 421, an outflow connector 422, and a junction connector 423. The junction icon 420 can be used when modeling the delivery of water from two water system components to one water system component or when modeling the delivery of water from one water system component to two water system components. A lateral channel component, which is graphically represented by lateral channel icon 430, represents a lateral channel in a water system that can be supplied with inflow water from a surface water source such as a main channel or a canal, groundwater from a groundwater source, and reuse water from a reuse source, and that can generate an outflow of water to one or more water system components such as a rice field, other crops field, or a canal. The lateral channel icon 430 includes an inflow connector 431, an outflow connector 432, a groundwater connector 433, a reuse connector 434, and generic connectors 435 and 436. As discussed above, the groundwater connector 433 of lateral channel icon 430 may be used to connect a lateral channel component, as represented by the icon, to a groundwater component, and the reuse connector 434 of lateral channel icon 430 may be used to connect a lateral channel component, as represented by the icon, to a reuse water component.

An evapotranspiration component, which is graphically represented by evapotranspiration icon 440, represents net evapotranspiration. The evapotranspiration icon 440 includes an evapotranspiration connector 441. The evaluation system allows a user to define the parameters of the evapotranspiration component such as net evapotranspiration. For example, the user may specify for an evapotranspiration component the rainfall and evapotranspiration that are anticipated at various intervals, with net evapotranspiration being the difference between rainfall and evapotranspiration. A rice field component, which is graphically represented by rice field icon 450, represents a rice field. A rice field has a water demand, evapotranspiration characteristics, and drainwater. The evaluation system allows a user to specify for a rice field component the water demand for the rice field, characteristics of the evapotranspiration, and the anticipated drainwater. The rice field icon 450 includes a water demand connector 451, a drainwater connector 452, and an evapotranspiration connector 453. An other crops component, which is graphically represented by other crops field icon 460, represents crops other than rice. The other crops field icon 460 includes a water demand connector 461 and an evapotranspiration connector 463. A groundwater source component, which is graphically represented by groundwater source icon 470, represents a groundwater source (e.g., groundwater supplied from a groundwater basin by a well). The evaluation system allows a user to specify for the groundwater source component the volume of a groundwater that is supplied. The groundwater source icon 470 includes groundwater connector 471. A reuse pump component, which is graphically represented by reuse pump icon 480, represents a reuse pump, which pumps water that is to be reused. The reuse pump icon 480 includes an inflow connector 481 and a reuse connector 482. A region may include river/surface water diversions, channels, wells, fields, surface drains, reuse, reservoirs, water and waste water treatment plants, water desalinization plants, and other water system elements. A river/surface water diversion component can be used to represent any pumped or gravity fed surface water source that can be used to supply water to the region. The evaluation system allows users to define various parameters for the surface water diversion component, including multiple contractual rights to the water source (water rights), contractual costs associated with the water source, schedules of availability of the water source, and operational costs associated with supplying the water source such as power for pump operations.

Figure 19:
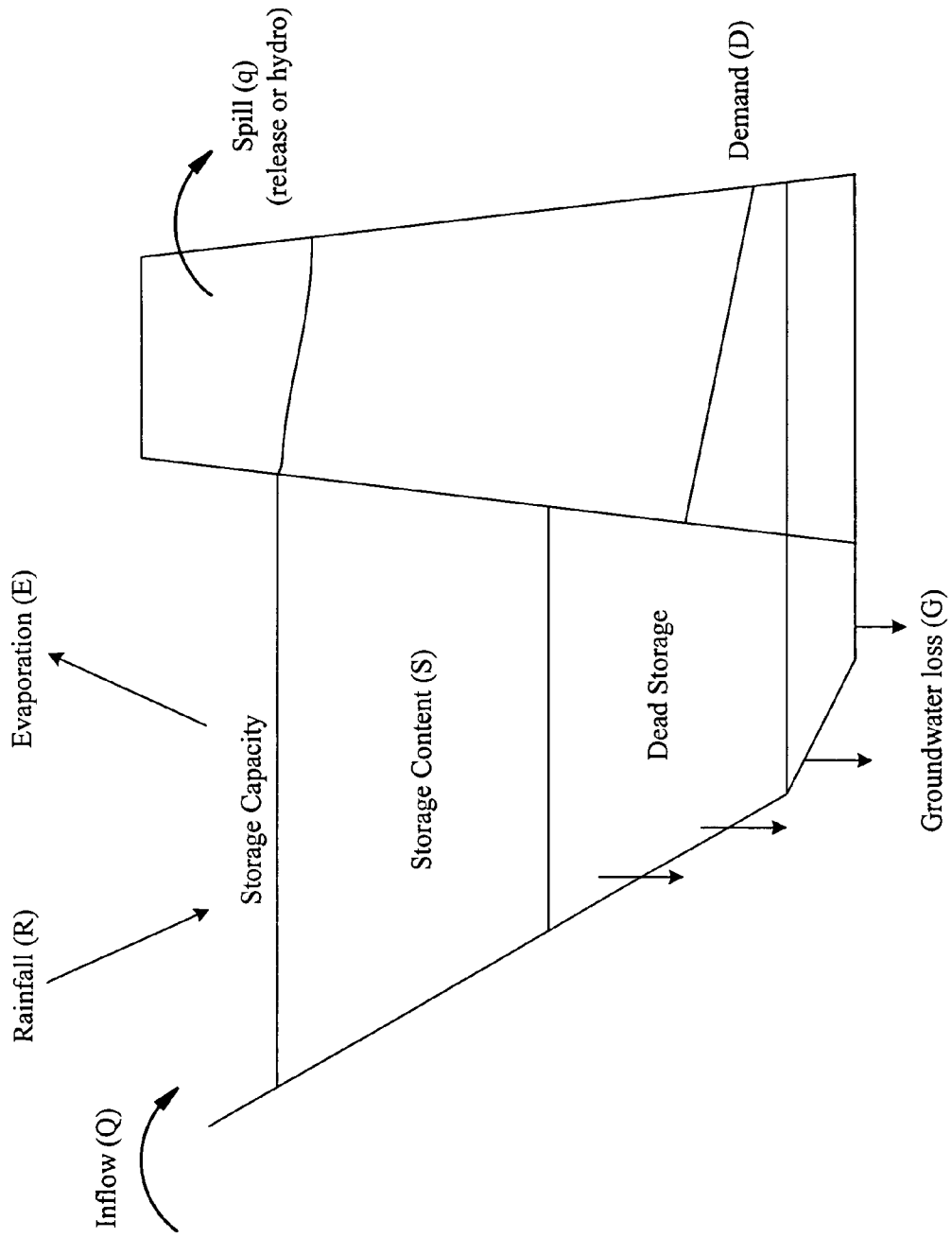
FIG. 19 illustrates a water balance equation of a reservoir in one embodiment.

The evaluation system "rolls up" the water balance for the water distribution system to the surface water diversion component, as the furthest "upstream" component. The water output of the surface water diversion component is the quantity of water needed to complete the water balance for the water system. The evaluation system calculates this closing term for the water balance based on the water balance results from downstream water system components, which are determined based on the parameters associated with these components, and the flow paths of water from the surface water diversion component to the downstream water system components. Other water system components representing water sources such as reservoirs, water and wastewater treatment plants, and water desalinization plants can be developed for use in the evaluation system. Each of these components can be configured to receive and supply water from other water system components, to allow a user to input relevant parameters, and to have an associated water balance calculation. For example, a reservoir component can be used to represent a reservoir or other large body of surface water that supplies water to the region or to individual system operating units. The evaluation system allows users to define various parameters for the reservoir component, including amount of rainfall and evaporation. The reservoir component may receive water from various other water system components such as main channels, lateral channels, rivers, rainfall, and canals and supply water to system operating units and to various water system components such as main channels, lateral channels, rivers, and fields. The reservoir component has a water balance calculation to determine the estimated safe yield (i.e., the amount of water available to meet downstream demands). FIG. 19 illustrates a water balance equation of a reservoir in one embodiment.

Main channel and lateral channel components represent the main and lateral channels that pass flow on from upstream points to downstream points in a water distribution system. Lateral channels generally move water from a main channel to one or more crop fields. Both channel components may have a similar set of user-defined parameters, including flow capacity, seepage and other conveyance loss rates, and end-spill losses. Each channel component has a local water balance calculation to determine the upstream inflow required to meet the downstream demands, which is then passed on to the next upstream water system component. The evaluation system determines the required upstream inflow for each lateral and main channel component by the following equations:

Lateral Channel: upstream inflow=downstream demand+end spill loss−groundwater supply−drainwater reuse Main Channel: upstream inflow=downstream demand*(1+conveyance loss %)

A groundwater source component represents a flow of water from a groundwater basin into lateral channels or onto fields. The evaluation system allows users to input for a groundwater source component various parameters including an allowable maximum pumping schedule for the groundwater basin based on local limits, such as draw-down or other basin management objectives, a specific pumping schedule for the groundwater basin less than or equal to the defined limits, and the unit cost of obtaining water from the groundwater basin. Output from the groundwater source component's water balance includes a water supply, which is passed to the water system component connected to the groundwater source component.

The evaluation system allows the modeling of system operating units ("SOUs") within the water distribution system, such as a single ditch tender route, a defined area served by a lateral channel, or any other logical grouping, based on the local irrigation district's layout and operating practices. SOUs can vary from a few hundred acres up to thousands of acres depending on the actual local system layout. Each SOU comprises one or more water system components such as lateral channels, rice fields, other crops fields, groundwater sources, drains, and so on.

Because rice irrigation and cultural practices represent a unique set of water supply and drainwater production factors, the evaluation system represents rice fields by a specific water system component, the rice field component, to track these factors. The evaluation system allows users to define, for rice field components, parameters such as the net acreage of rice in each SOU, initial crop establishment flood up depth (inches per acre of standing water), surface outflow from maintenance flows (steady low flows to maintain temperature and water quality objectives), surface drainage outflows due to field draining for pesticide or fertilizer applications, and preharvest drainage outflows. The evaluation system allows each of these to be defined for each model time step. Deep percolation losses from the rice fields can be defined as a standard loss rate expressed as a unit depth per time period, such as inches per week.

The evaluation system performs a net water balance for each rice field component using these parameters coupled with evapotranspiration ("ET") water demands for rice. The evaluation system calculates ET water demand for a crop type, including rice, using a separate model that allows input of parameters such as local climate and ET coefficients for the crop type. Output from the rice field component's water balance includes a resulting water demand, which is passed back to the upstream water system component connected to the rice field component, and a surface outflow, which is an input to the local drainage and can be directed to one or more other water system components such as a main channel component or a reuse pump component. The evaluation system determines the rice field component's water demand by the following equation:

Water demand=rice acreage*$ET_{rice}$+deep percolation+surface outflows

The evaluation system models all other crop fields in a similar way. For each other crops component, the evaluation system allows a user to input parameters including the net irrigated acreage for each crop type, the method of irrigation (e.g., drip, sprinkler, and furrow flood) for each crop, the percentage of the total acreage on which each method of irrigation is used, and soil permeability (deep percolation rates). Output from the other crops component's water balance includes a resulting water demand, which is passed back to the upstream water system component connected to the other crops component. The evaluation system calculates the other crops component's water demand as the sum of the water demands of each individual crop type identified in the other crops component's parameters. The evaluation system determines the water demand for an individual crop type by the following equation:

Water demand=crop type acreage*$ET$/weighted average irrigation efficiency

The evaluation system models standard local reference crop ET rates and crop coefficients for a wide range of local crop types. The evaluation system allows this data set to be populated with locally available data or standard reference sets as available. The evaluation system uses the reference ET ("REF ET") and crop coefficients ("Kc") to estimate ET water demand for rice and other crop fields for each time step. The evaluation system determines the ET for a crop by the following equation:

Crop $ET$=REF $ET$*$Kc$

The evaluation system can model various irrigation methods such as drip, sprinkler, and furrow flood, and the associated overall application efficiency rate for each. The evaluation system allows the efficiency rate to be set based on locally available data or standard reference values. The evaluation system uses the application efficiency for each method to estimate the weighted average irrigation efficiency.

The evaluation system models surface drains as flow conveyance links. The evaluation system allows surface drains to have upstream and downstream connections. Inflow to the surface drains comes from channel end spills, rice field surface drainage, and other crop surface drainage.

The evaluation system models drainwater reuse for both pumped and gravity recapture points. A drainwater reuse component represents points in the system where available surface water in the drains is diverted into lateral channels for reuse. The drainwater reuse component can be connected at its "upstream" end to a local surface drain component and at its "downstream" end to a lateral channel component. The evaluation system allows a user to define for the drainwater reuse component parameters including the cost of recapture (i.e., power costs for pumping) and a maximum allowable reuse rate expressed as percentage of total available drainwater supply. The drainwater reuse component is connected to a specific surface drain component, which in turn has calculated total drain supply based on its inflow calculations. Output from the drainwater reuse component's water balance includes a water supply, which is passed to the water system component, such as a lateral channel, connected to the drainwater reuse component.

The evaluation system allows the modeling of regional drain outflow and inflow to simulate surface drainwater flows into and out of the overall district system. For regional drain inflows such as sloughs or outflows from upstream districts, the user-defined input is a schedule of forecast flows per time step. For outflow points, the input is the net water balance passed on from the upstream drain, and the output is the net drainwater outflow from that point.

Figure 5:
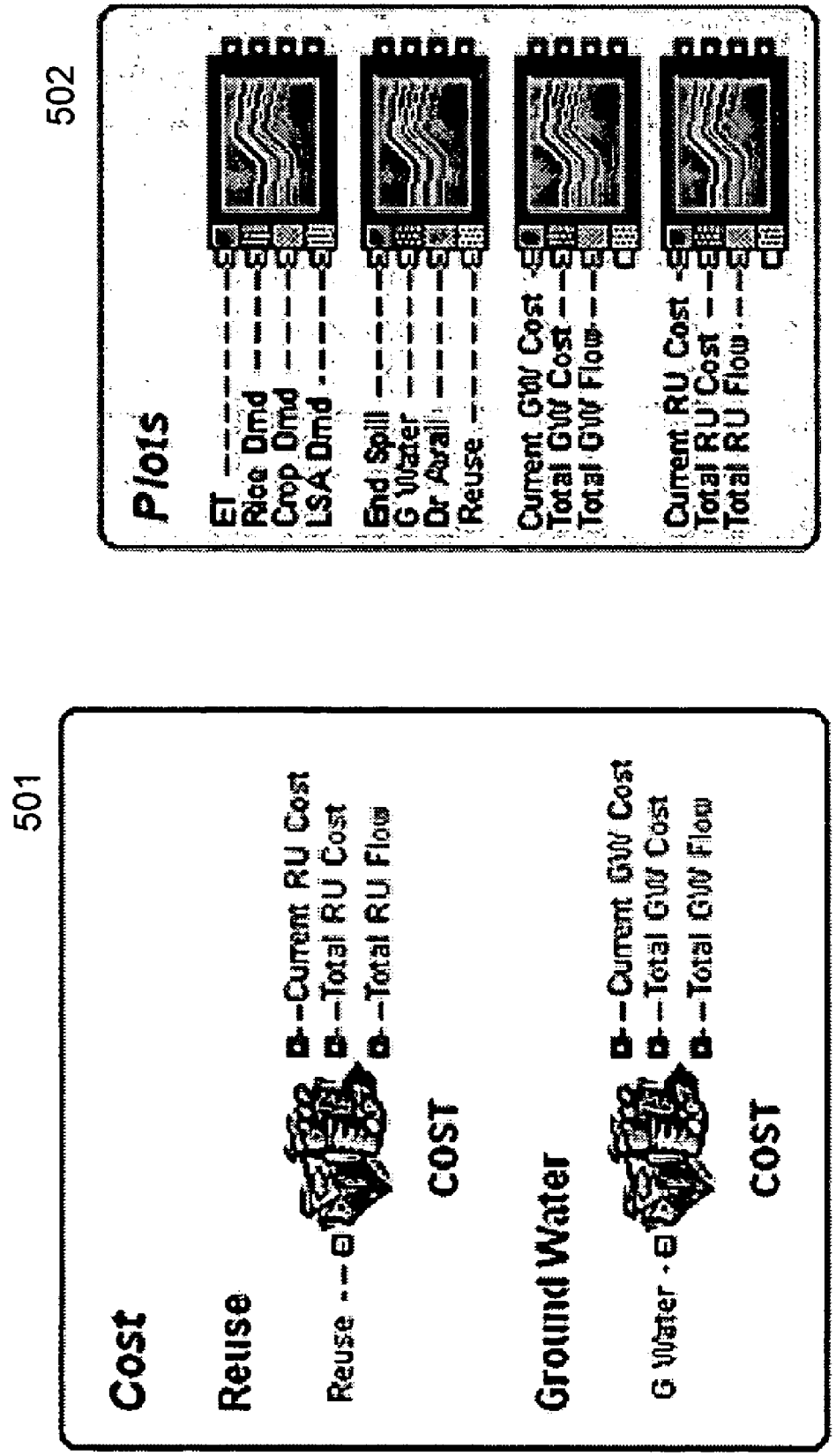
FIG. 5 represents icons that can be selected by a user to display various statistics generated by the evaluation system.

FIG. 5 represents icons that can be selected by a user to display various statistics generated by the evaluation system. When a user selects one of the icons within box 501, the evaluation system displays the appropriate cost and related information. When a user selects the icons from box 502, the evaluation system displays the appropriate graph illustrating the information.

Figure 6:
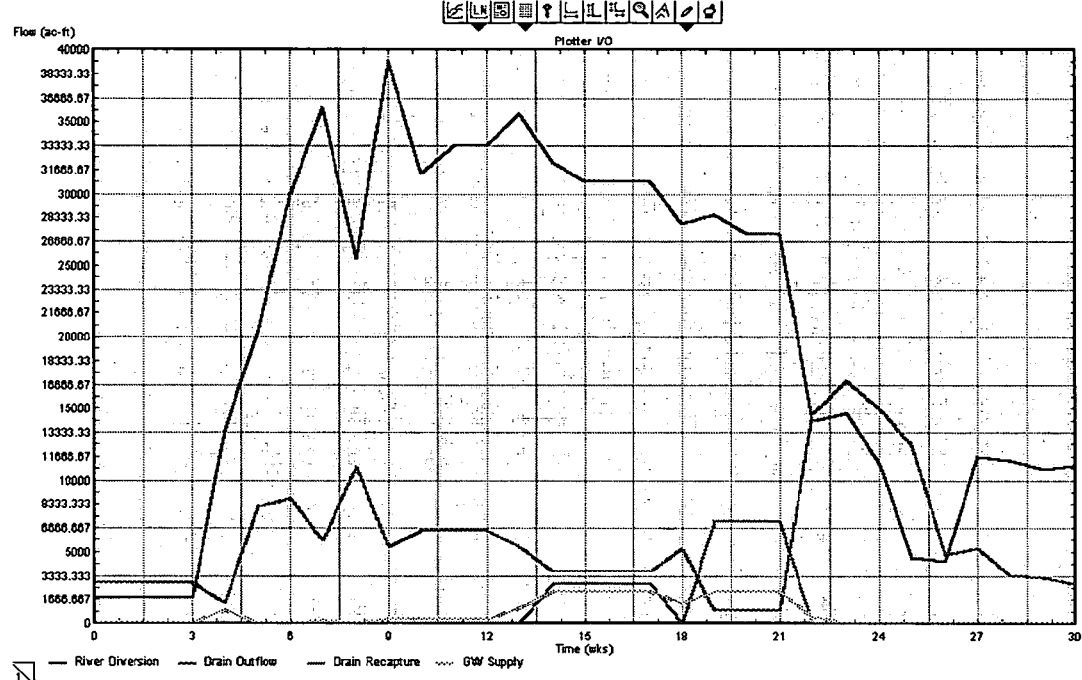
FIG. 6 is a diagram that illustrates graphs of various information of the evaluation system in one embodiment.
Figure 6:
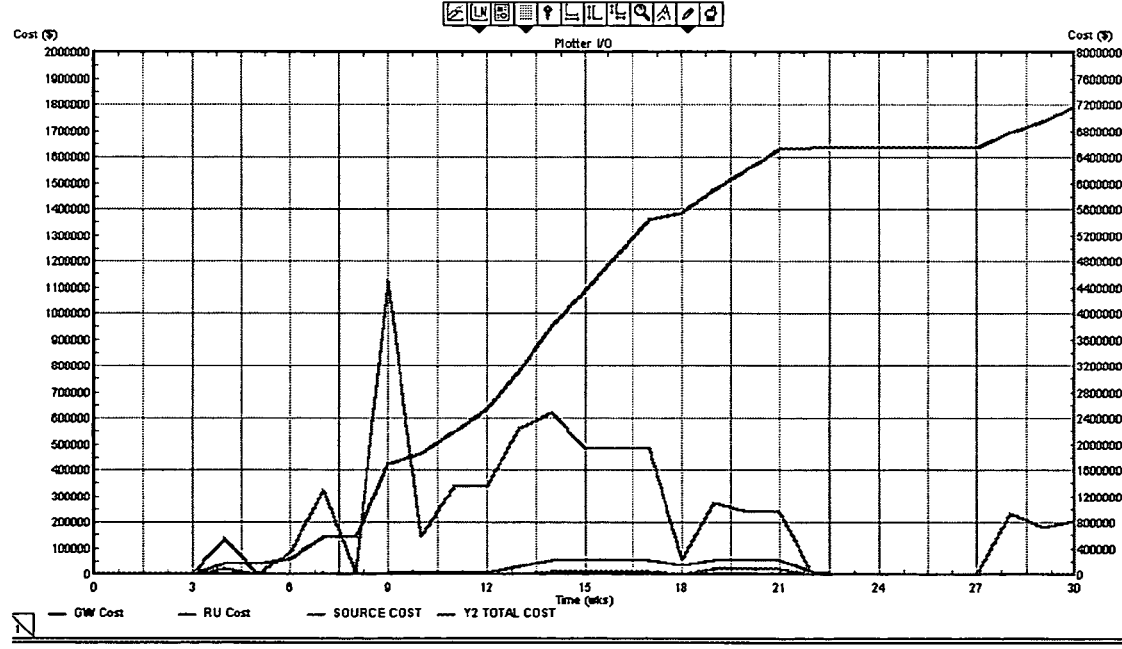

FIG. 6 is a diagram that illustrates graphs of various information of the evaluation system in one embodiment. Graph 601 displays river diversion, drain outflow, drain recapture, and groundwater supply associated with a SOU over various time intervals. Graph 602 illustrates the groundwater cost, reuse costs, source cost, and year-to-date total cost for the SOU over the same time.

Equations 1–7 define an objective function and various constraints in one embodiment. The objective function that is to be minimized is represented by the following:

$$\sum_{i=1}^{TP}\left\{\sum_{k=1}^{NS} Q_i^k C_i^k + \sum_{j=1}^{NU}(RU_i^j CR_i^j + GW_i^j CG_i^j)\right\} \quad (1)$$

where $Q_i^k$ is supply of source k during time period i, $C_i^k$ is cost of source k during time period i, $RU_i^j$ is reuse supply of system operating unit j during time period i, $CR_i^j$ is unit reuse cost of system operating unit j during time period i, $GW^j$ is groundwater supply of system operating unit j during time period i, $CG_i^j$ is cost of groundwater supply of system operating unit j during time period i, TP is number of time periods, NS is number of sources, and NU is number of system operating units.

Equations 2–7 define various constraints for the optimization. A constraint on reuse of water is represented by the following:

$$RU_i^j \leq Max\_Pct\_RU_i^j * Dr\_Av_i^j \quad (2)$$

where $Max\_Pct\_RU_i^j$ is the upper limit of percent reuse for system operating unit j during time period i and $Dr\_Av_i^j$ is drainwater available for reuse by system operating unit j during time period i.

A constraint for groundwater use is represented by the following:

$$GW_i^j \leq Max\_Pump_j^i \quad (3)$$

where $Max\_Pump_j^i$ is the upper limit on groundwater pumping for system operating unit j during time period i.

A constraint for reuse and groundwater is represented by the following:

$$RU_i^j + GW_i^j \leq Dmd_i^j \quad (4)$$

where $Dmd_i^j$ is water demand for system operating unit j during time period i.

A constraint on the amount of water provided by a water supply is represented by the following:

$$Q_i^k \leq \min\left(Max\_Q_i^k, \sum_{j=1}^{NU}(Dmd_i^j + Spl_i^j) * (1.0 + Conv\_loss)\right) \quad (5)$$

where $Max\_Q_i^k$ is the maximum available supply of source k during time period i, $Spl_i^j$ is the end spill amount of system operating unit j during time period i, and Conv_loss is the fraction of conveyance loss of the channel that supplies source k.

A further constraint on the amount of water provided by a water supply is represented by the following:

$$\sum_{k=1}^{NS} Q_i^k \leq \sum_{j=1}^{NU}(Dmd_i^j + Spl_i^j) * (1.0 + Conv\_loss) \quad (6)$$

A constraint on supplies and demands is represented by the following:

$$\sum_{k=1}^{NS} Q_i^k + \sum_{j=1}^{NU}(RU_i^j + GW_i^j)*(1.0+\text{Conv\_loss}) = \sum_{j=1}^{NU}(Dmd_i^j + Spl_i^j)*(1.0+\text{Conv\_loss}) \quad (7)$$

Figure 7:
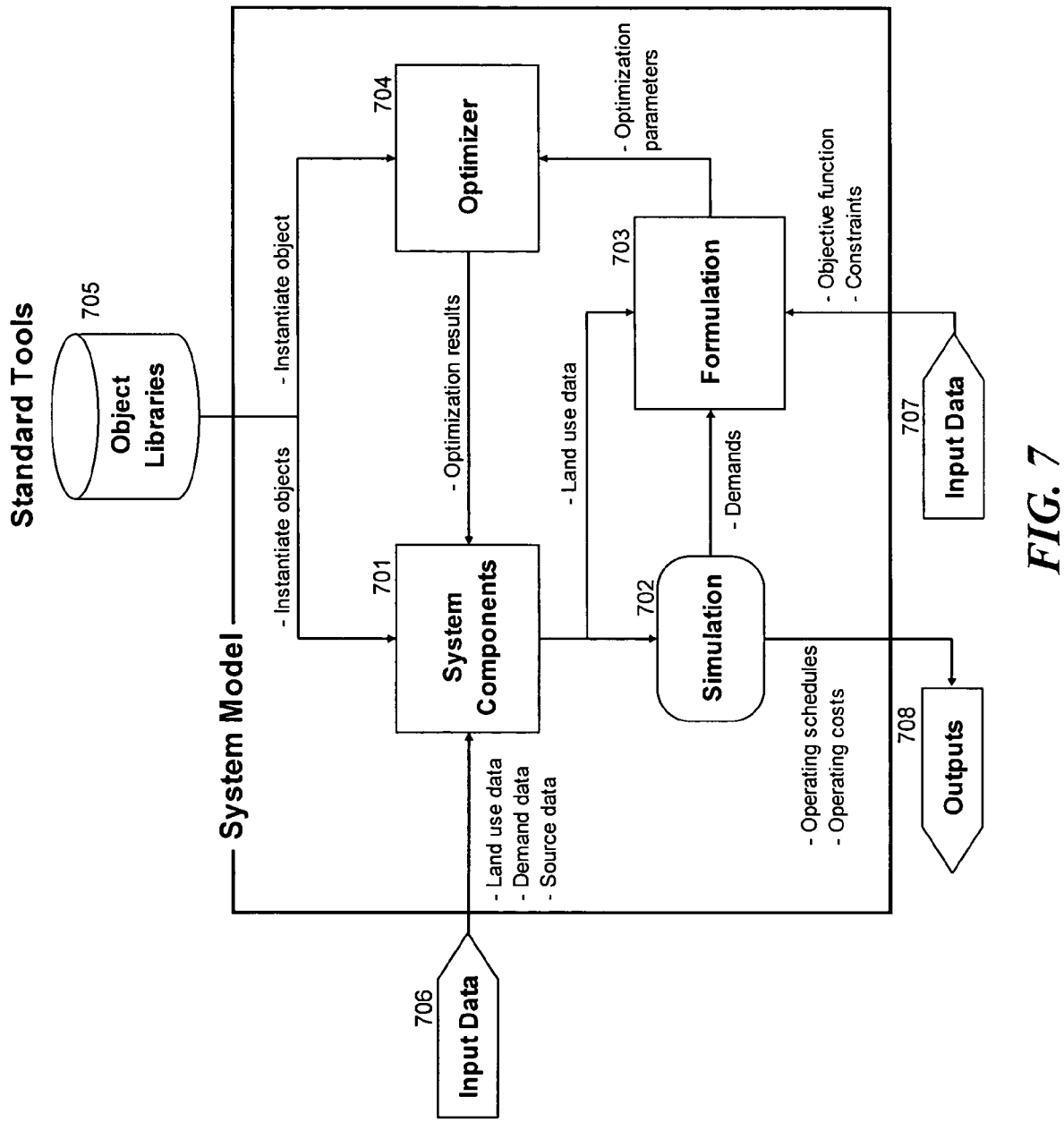
FIG. 7 is a block diagram that illustrates modules of the evaluation system in one embodiment.

FIG. 7 is a block diagram that illustrates modules of the evaluation system in one embodiment. The evaluation system comprises a system components module 701, a simulation module 702, a formulation module 703, and an optimizer module 704. The system components module 701 is used to generate the water system design for a region. The system components module 701 receives user input on the placement of icons representing the water system components and their interconnections. The user selects the icons from the object libraries 705. The system components module receives user input 706 for the various parameters of the water system components, including land use data, water demand data, and water source data. The system components module stores the design and the user-specified parameters. The system components module 701 handles interaction with the user to place icons, connect icons, and set values for various parameters of the water system components. The system components module 701 may also import information from a geographic information system.

The simulation module 702 simulates the flow of water based on the design and parameters stored by the system components module 701. The simulation module 702 instantiates objects of the object libraries 705 for each water system component represented by an icon in the design. In one embodiment, an object class is defined for each type of icon. For example, each type of a field has its own object class that is instantiated by the simulation module 702 to calculate the water flow related to that object class. The results from the simulation module 702 such as operating schedules or operating costs may be exported to or viewed using output tools 708 such as plotters or computer monitors. The results from the simulation module 702 such as water demands may also be supplied to the formulation module 703.

The formulation module 703 creates the optimization parameters used by the optimizer module 704. The formulation module 703 receives user input 707 on the objective function and the constraints. The formulation module 703 receives water demand information for the water system design from the simulation module 702 and parameters of the water system components such as land use data from the system components module 701. The formulation module 703 calculates the optimization parameters using the information supplied by the user, the system components module 701, and the simulation module 702. The formulation module 703 supplies the resulting optimization parameters to the optimizer module 704.

The optimizer module 704 instantiates the optimization tool from the object libraries 705. Using the optimization tool and the optimization parameters received from the formulation module 703, the optimizer module 704 calculates the optimization results for the water system. The optimization results can be provided to the system components module 701, and the simulation module 702 can be run to generate the water flow for the optimized system.

Figure 8:
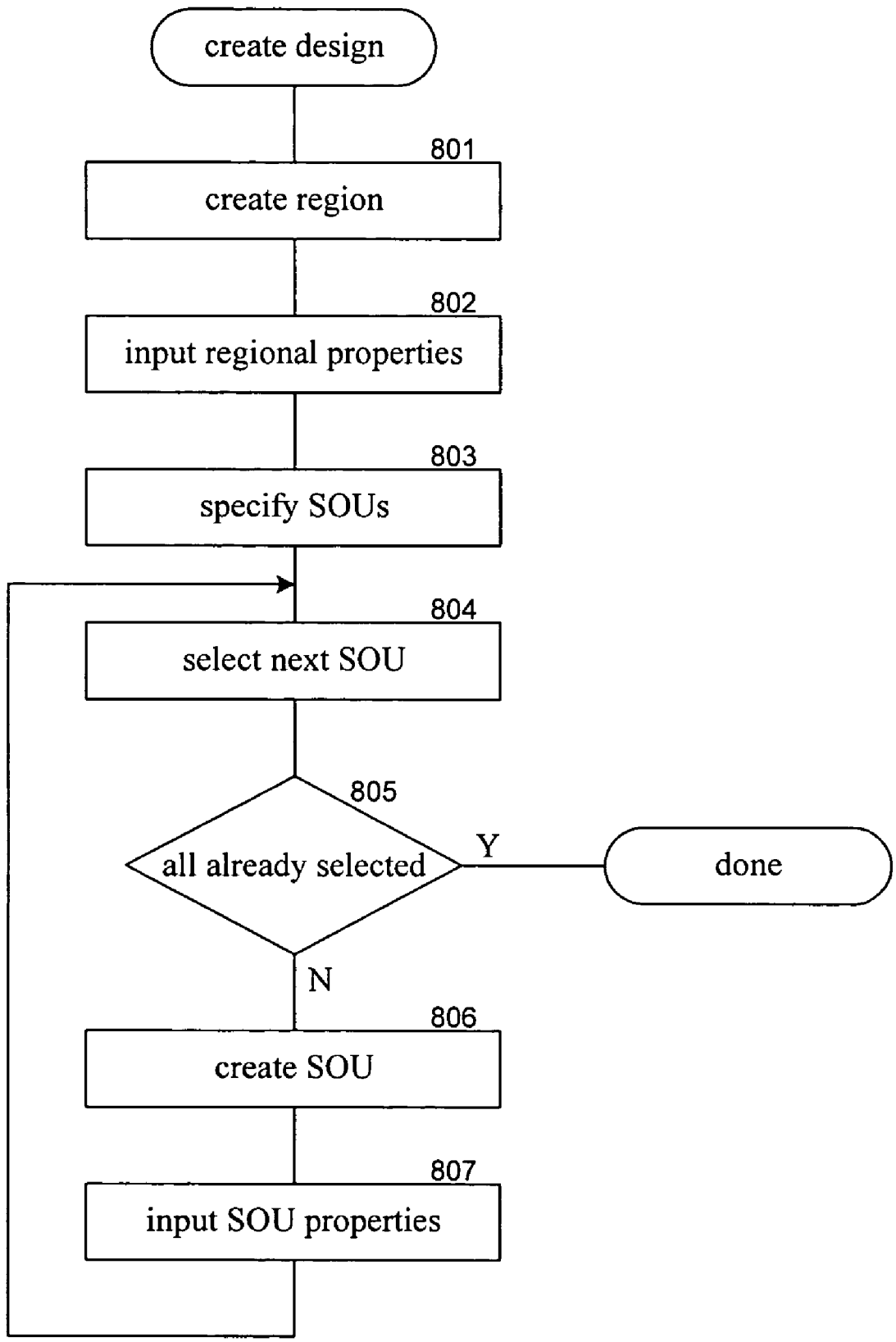
FIG. 8 is a flow diagram that illustrates processing of the system components module of the evaluation system in one embodiment.

FIG. 8 is a flow diagram that illustrates processing of the system components module of the evaluation system in one embodiment. The system components module controls the user interface for creating the graphical representation of the system operating units and setting the parameters of the water system components. In block 801, the module creates a region design based on user inputs. A user may select various water system component icons and place them on a display page that indicates the relationships of the water system components. In block 802, the module allows a user to specify properties of the region, such as defining the water supplies. In block 803, the module allows the user to specify the number of system operating units that are within the region and show their interconnections. FIG. 2 illustrates the graphical representation of the system operating units of a region. In blocks 804–807, the module loops selecting each system operating unit and creating a detailed design of the water system components within that system operating unit. In block 804, the module selects the next system operating unit. In decision block 805, if all the system operating units have already been selected, then the module completes, else the module continues at block 806. In block 806, the module creates the detailed design for the selected system operating unit. The module allows the user to place water system component icons on the display representing the various water system components. The user can interconnect the components to indicate water flow between the components. In block 807, the module specifies the parameters of each water system component. The module then loops to block 804 to select the next system operating unit.

Figure 9:
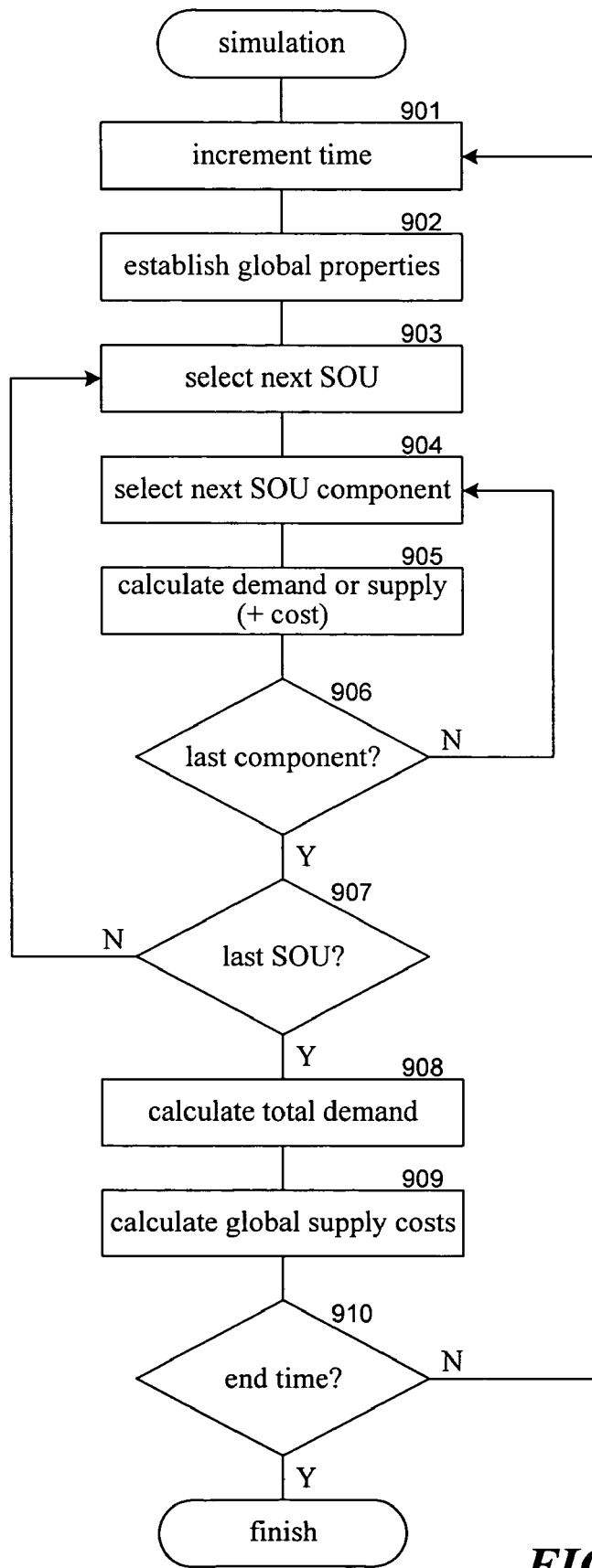
FIG. 9 is a flow diagram that illustrates the processing of the simulation module in one embodiment.

FIG. 9 is a flow diagram that illustrates the processing of the simulation module in one embodiment. The module performs the water balancing of the evaluation system for each indicated time increment or interval. The module initializes the objects for the simulation and invokes the objects for each interval of the iteration to calculate the demand and supply. In block 901, the module increments the time to the next interval. In block 902, the module establishes global parameters. In blocks 903–907, the module loops calculating the demand for each water system component of each system operating unit. In block 903, the module selects the next system operating unit. In block 904, the module selects the next water system component of the currently selected system operating unit. In block 905, the component calculates the demand or supply for the selected water system component for the current interval. In decision block 906, if all the water system components have already been selected, then the module continues at block 907, else the module loops to block 904 to select the next water system component. In decision block 907, if all the system operating units have already been selected for the current interval, then the module continues at block 908, else the module loops to block 903 to select the next system operating unit. In block 908, the module calculates the total water demand. In block 909, the component calculates the global supply costs. In decision block 910, if the end time of the simulation has been reached, then the module completes, else the module loops to block 901 to increment the time for the next interval.

Figure 10:
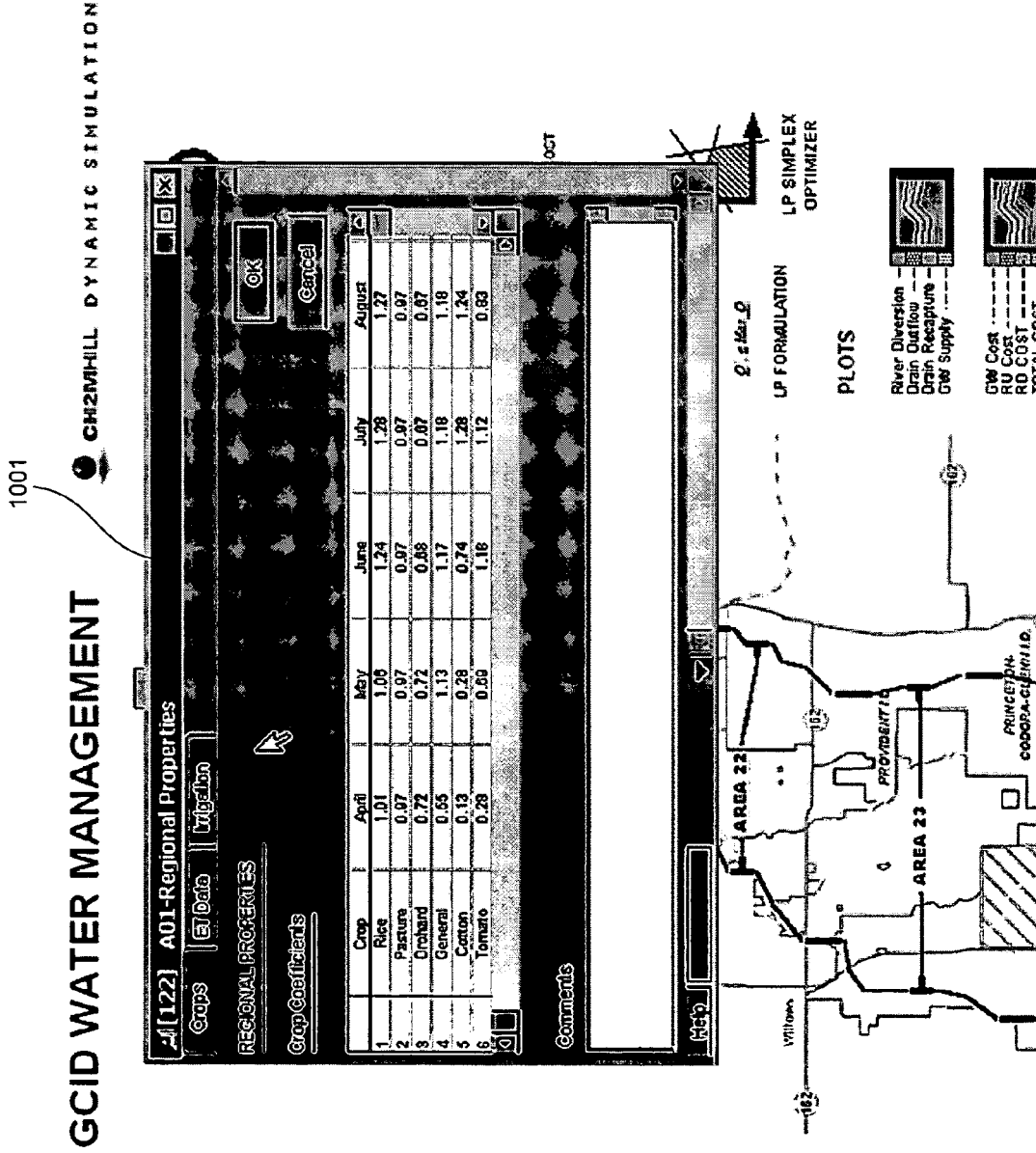
FIG. 10 illustrates the setting of crop-related parameters for a region.
Figure 11:
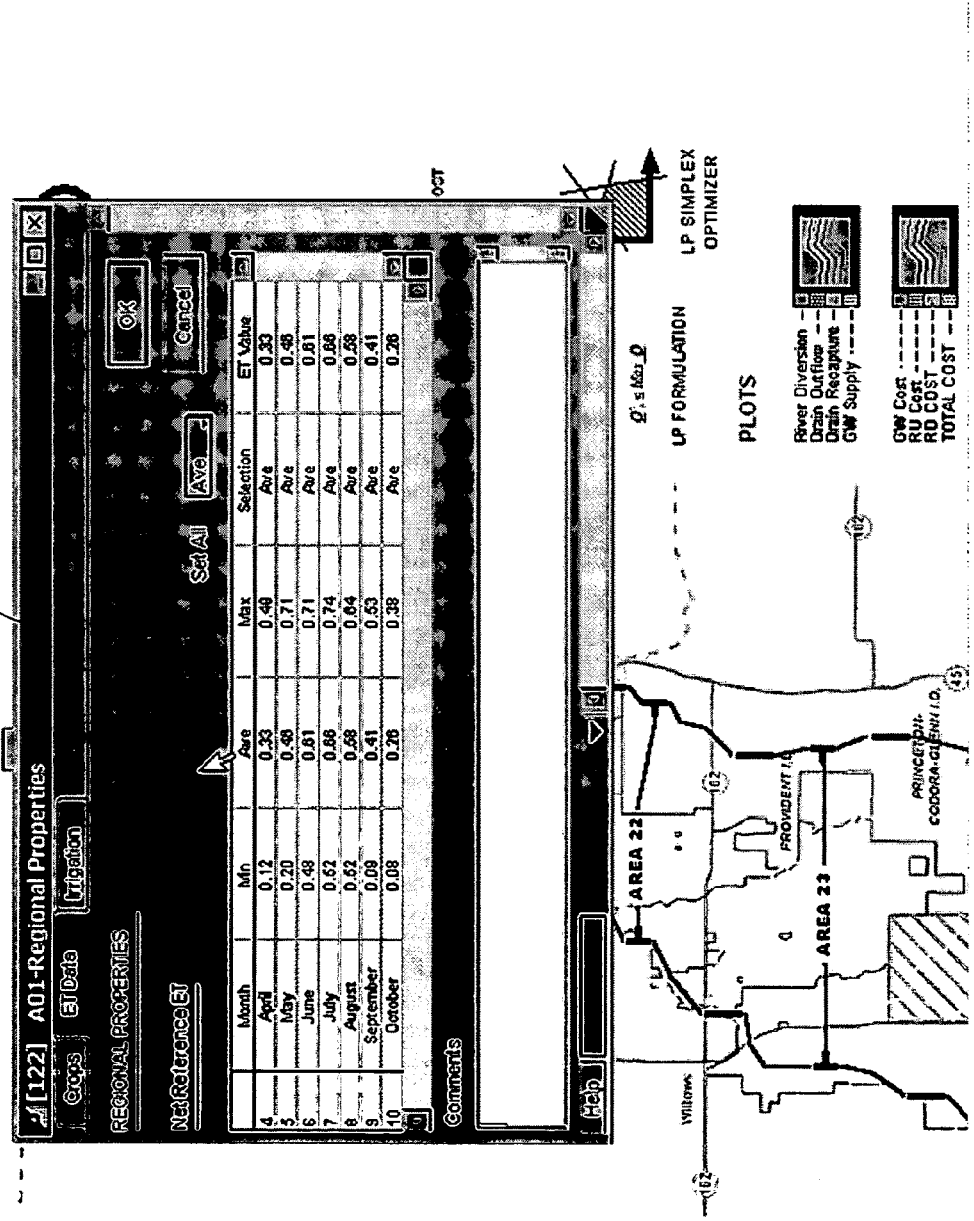
FIG. 11 illustrates the setting of evapotranspiration parameters of the region on a month-by-month basis.
Figure 12:
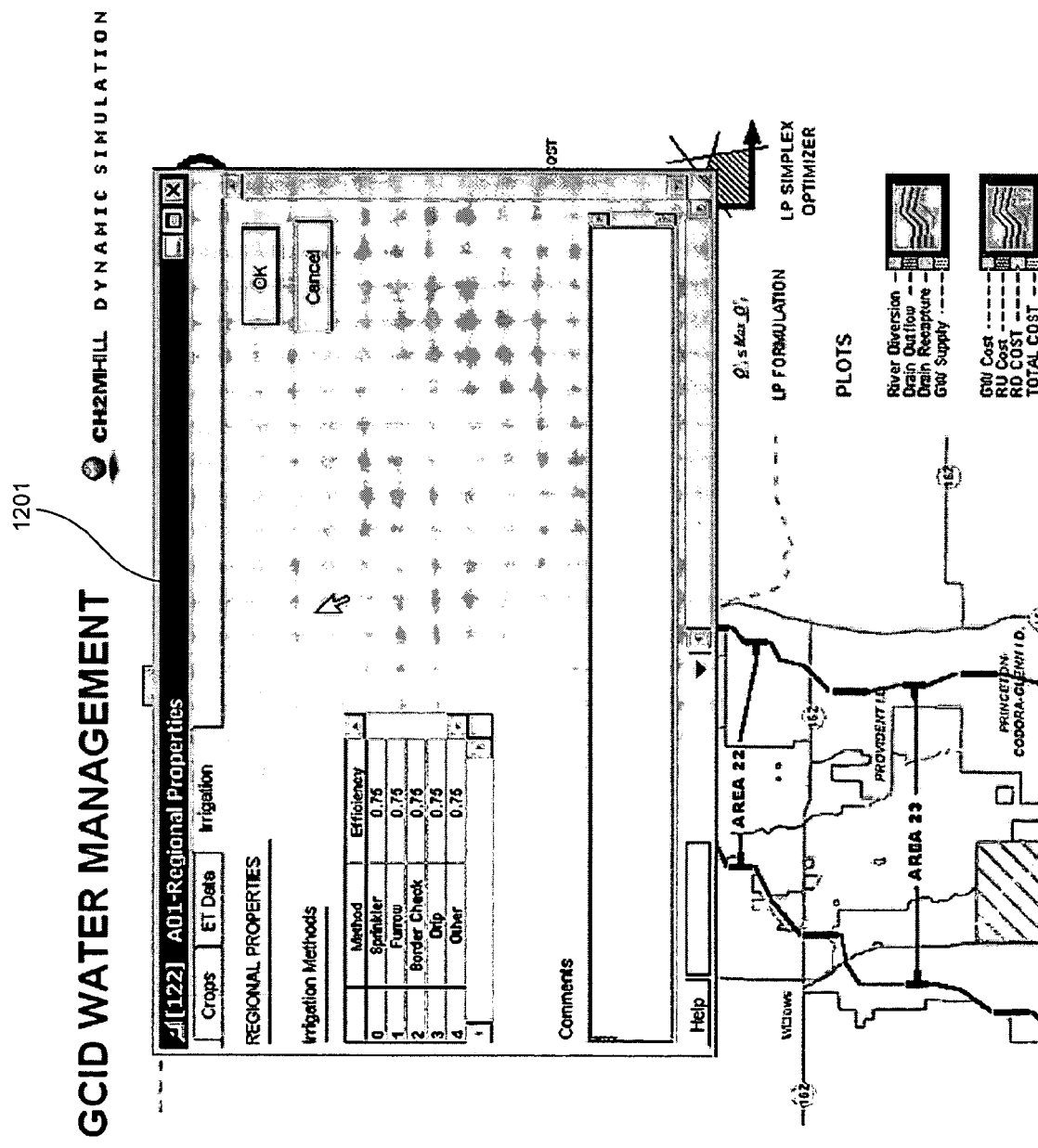
FIG. 12 illustrates the setting of irrigation-related parameters for a region.
Figure 13:
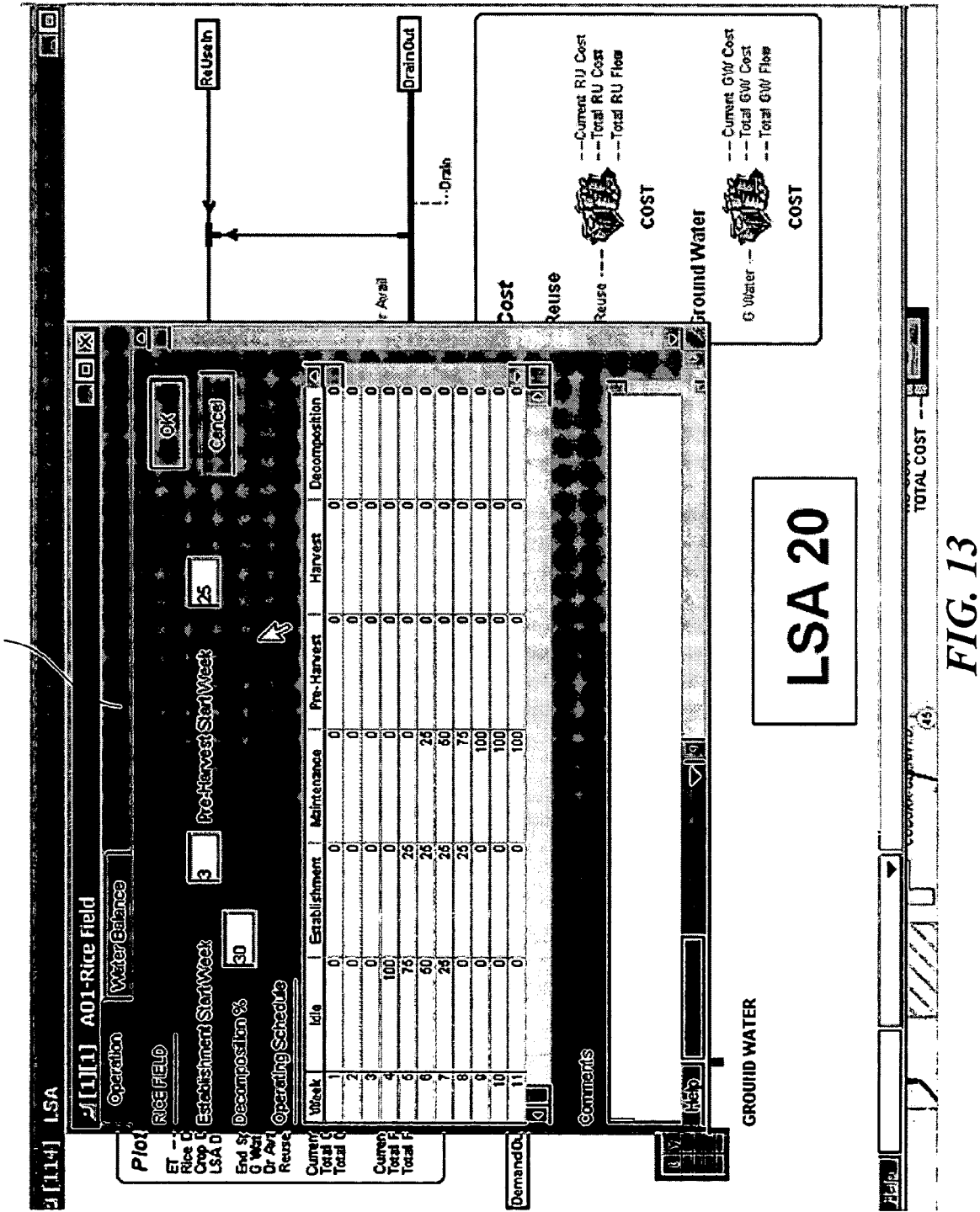
FIG. 13 illustrates the setting of parameters of a rice field within a system operating unit.
Figure 14:
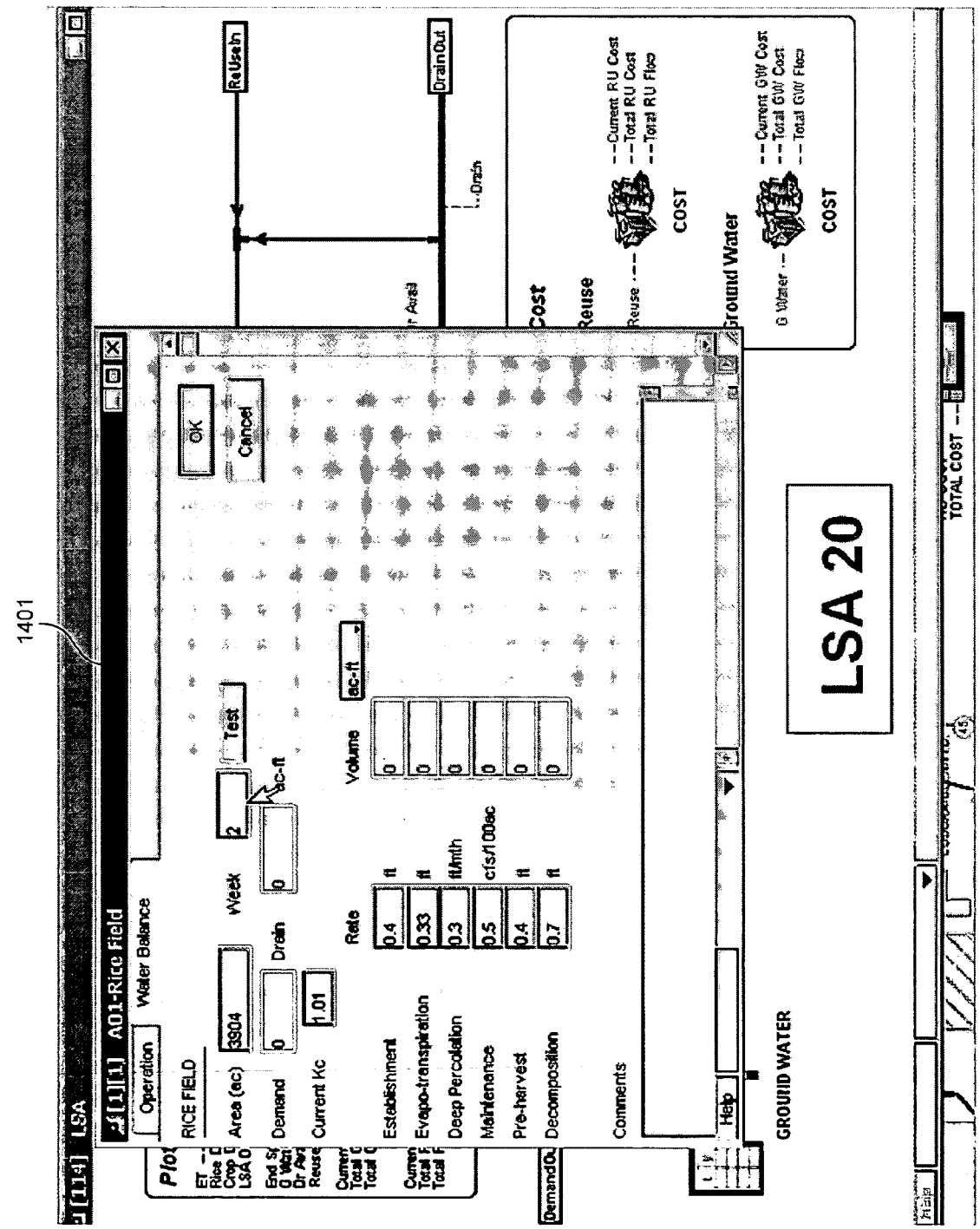
FIG. 14 illustrates the setting of parameters for the rice field.
Figure 15:
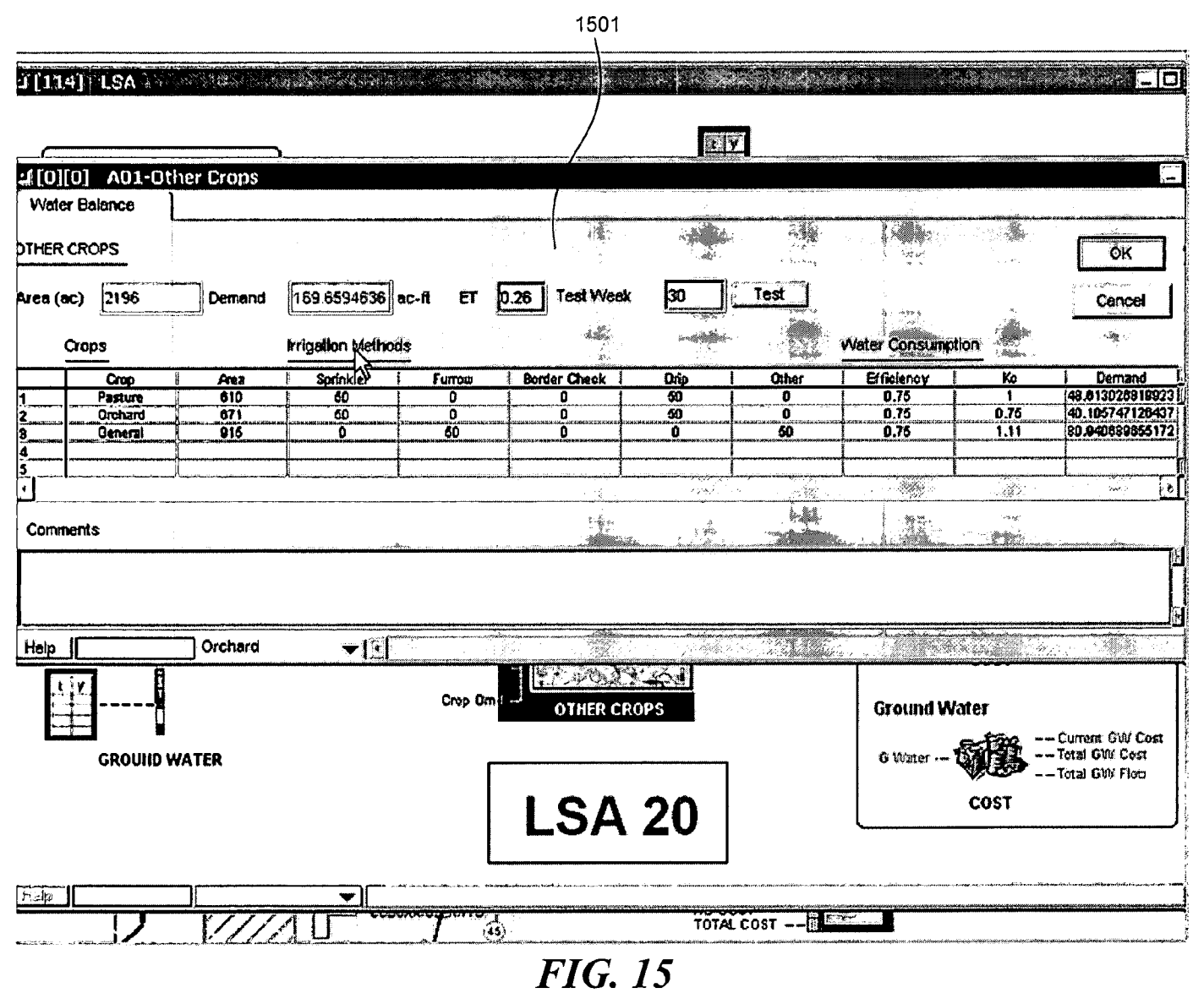
Figure 16:
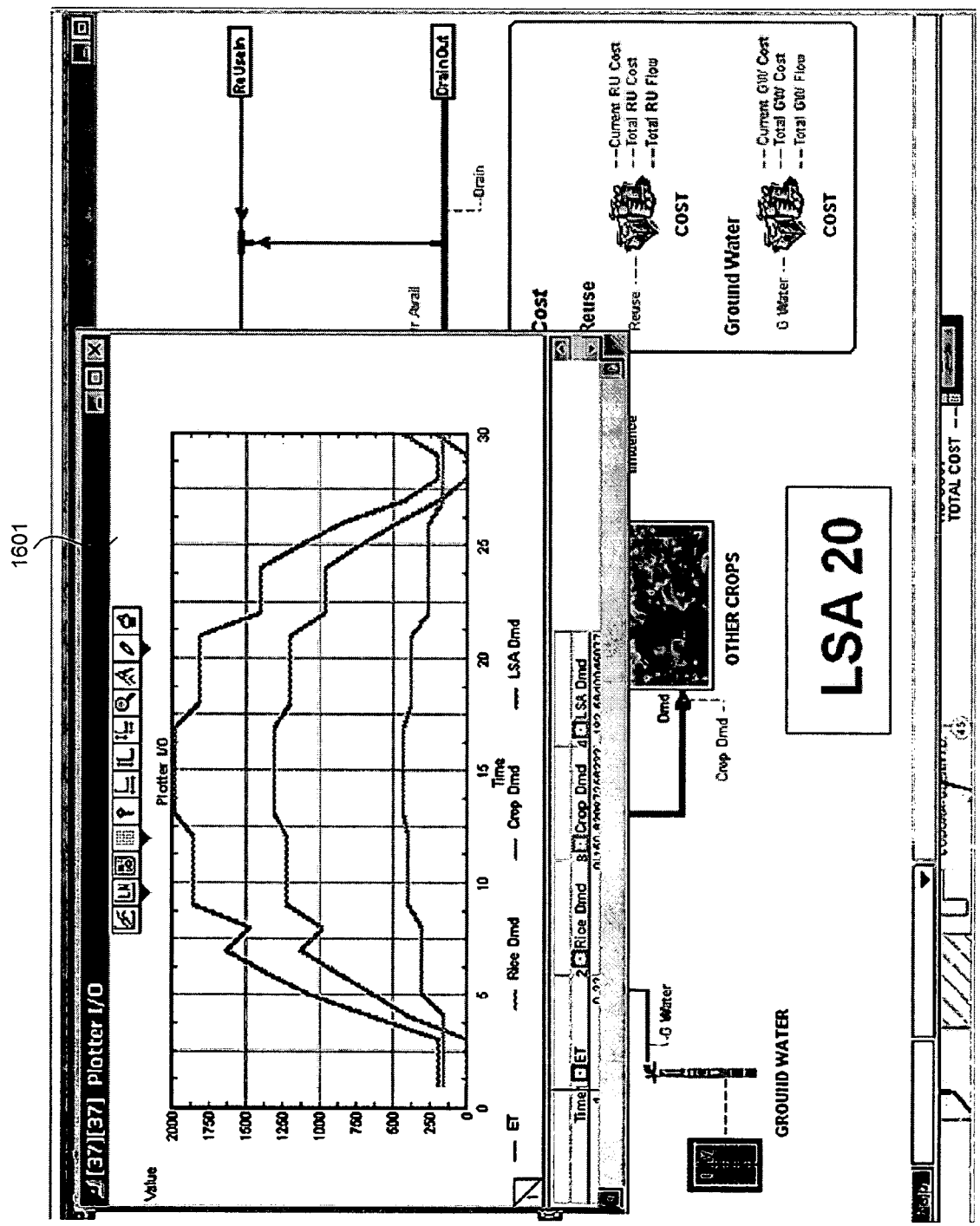
FIG. 16 illustrates a graph of the various values related to a system operating unit.
Figure 17:
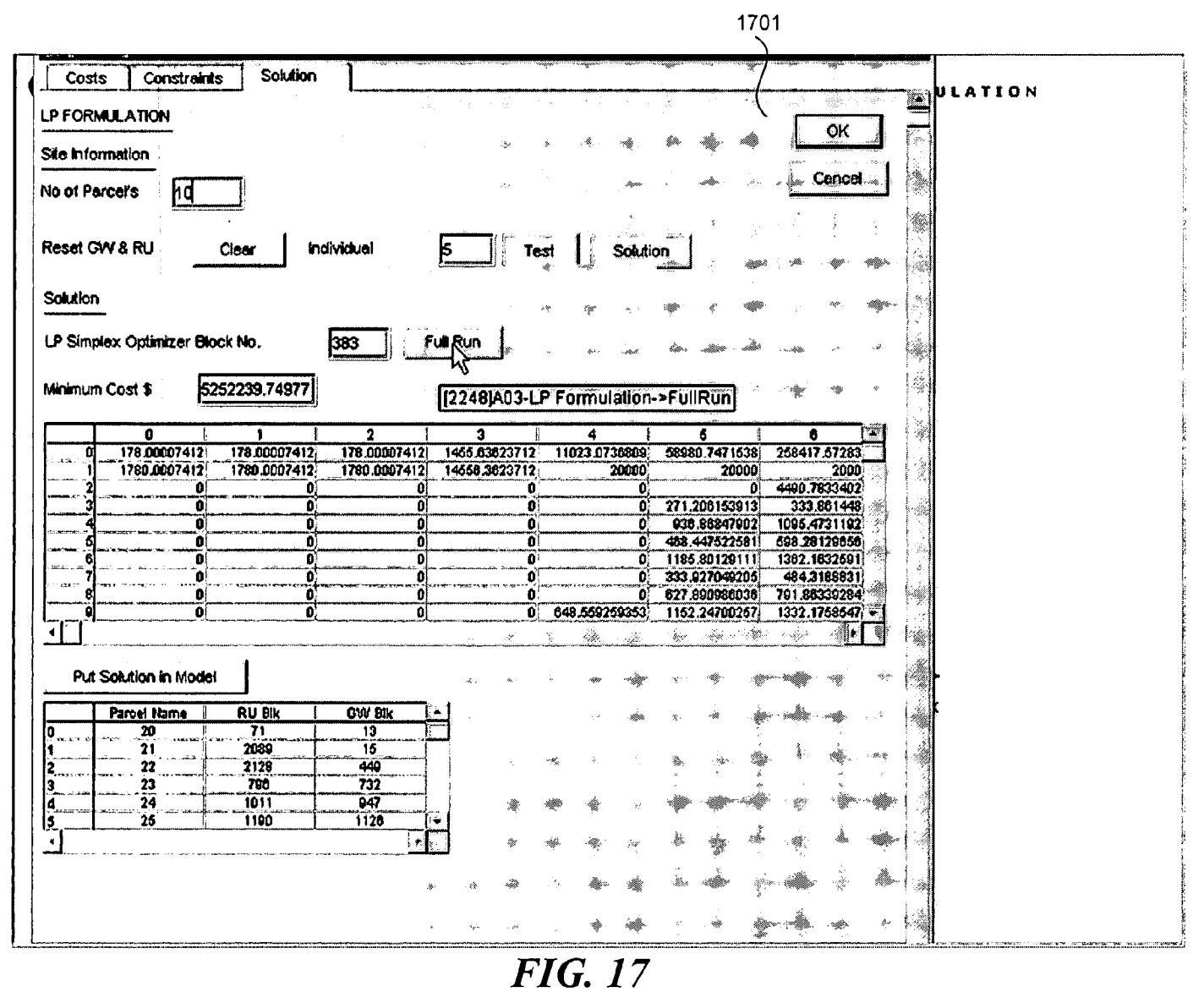
Figure 18:
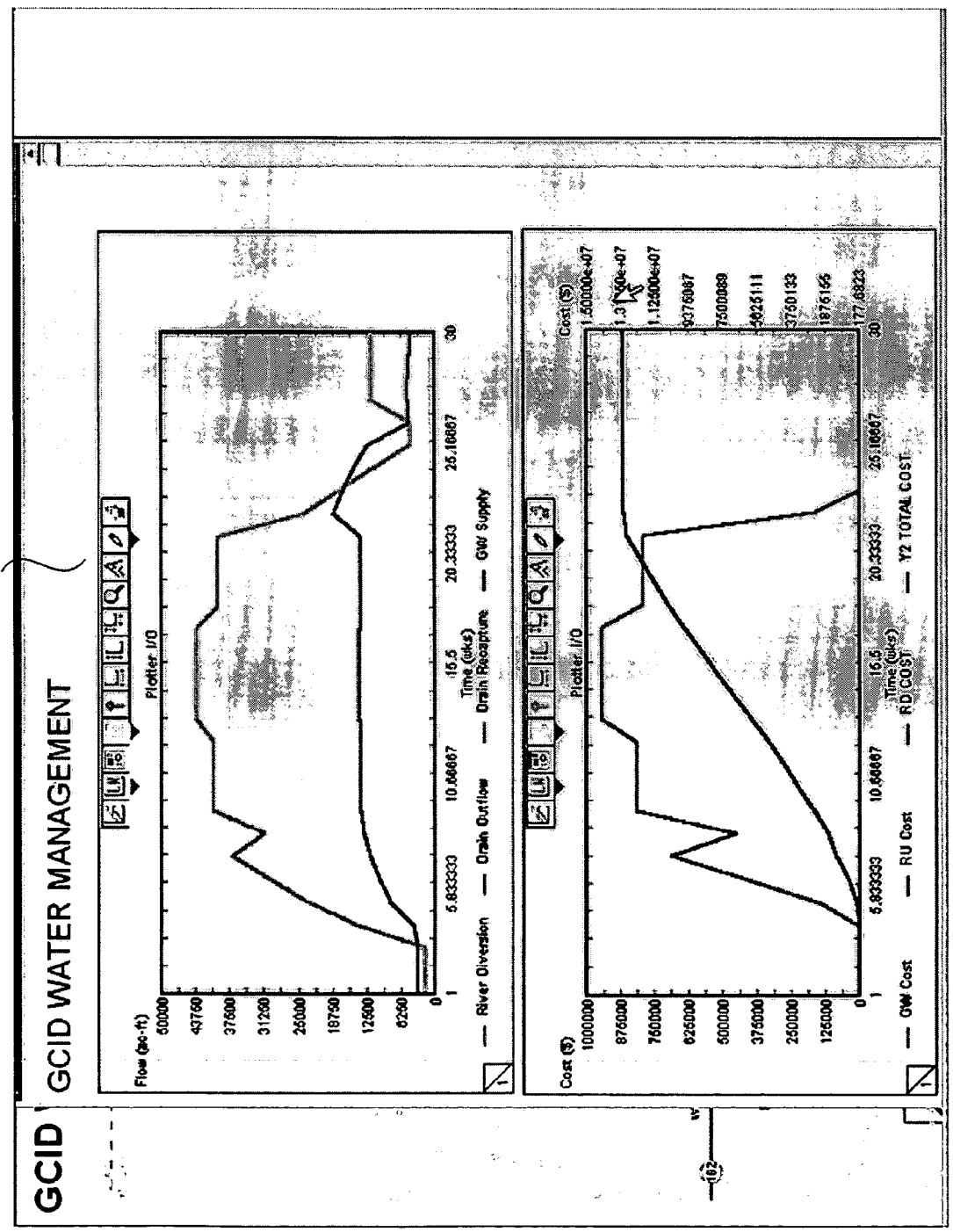
FIG. 18 illustrates graphs of the results of the optimization.

FIGS. 10–18 illustrate aspects of a user interface of the evaluation system in one embodiment. FIG. 10 illustrates the setting of crop-related parameters for a region. The evaluation system allows a user to define the various crops of a region along with the areas planted with those crops on a month-by-month basis using dialog box 1001. FIG. 11 illustrates the setting of evapotranspiration parameters of the region on a month-by-month basis. The evaluation system allows a user to define parameters that include minimum, average, and maximum rainfall along with an evapotranspiration value for the region using dialog box 1101. FIG. 12 illustrates the setting of irrigation-related parameters for a region. The evaluation system allows a user to define parameters that include irrigation method (e.g., sprinkler) and efficiency of the irrigation method using dialog box 1201. FIG. 13 illustrates the setting of parameters of a rice field component within a system operating unit. The evaluation system allows a user to define parameters including the week-by-week operating schedule for the rice field component using dialog box 1301. FIG. 14 illustrates the setting of water balance parameters for the rice field component. The evaluation system allows a user to define parameters including the area of the field and the rates of establishment, evapotranspiration, deep percolation, maintenance, preharvest, and decomposition using dialog box 1401. FIG. 15 illustrates the setting of water balance parameters for an other crops field component. The evaluation system allows a user to define attributes including the crop types, areas, irrigation methods, efficiency, and water demand using dialog box 1501. FIG. 16 illustrates a graph of the various values related to a system operating unit. In this example, the values for evapotranspiration, rice crop water demand, nonrice crop water demand, and overall water demand are graphed as shown in window 1601. FIG. 17 illustrates the setting of parameters relating to the optimization. The cost tab and constraints tab of dialog box 1701 may be selected to enter cost and constraint information for the optimization. The solution tab illustrates the resulting solution. FIG. 18 illustrates graphs of the results of the optimization. The upper graph of window 1801 illustrates the water demand on various water sources, and the lower graph illustrates the costs of the water over time.

In one embodiment, the evaluation system may use various water quality simulation tools to evaluate surface water quality. These tools can be used for evaluating agricultural non-point source loading and developing alternatives to meet total maximum daily load ("TMDL") objectives. One tool is based on the system operating units and uses data on crop acreage, on-farm best management practices ("BMPs"), and constituent loading/runoff functions to estimate water quality parameters for the drainwater leaving each system operating unit. Examples include nitrates, phosphates, and TDS loading. A menu of standard on-farm BMPs for reducing loading may also be used, including the cost of each BMP. The evaluation system can track outflow water quantity and quality in the drainage components of the model, to the outflow points, to show net outflow water quality to regional drains. This tool can be linked with the optimization components to add water quality and BMP costs as constraints for use in developing optimal water supply practices to meet water quality objectives.

A second tool links the output from each drain point to a QUAL-2E model network for the regional drains. The inputs to the QUAL-2E model can be used to simulate the water quality impacts to regional drainage systems based on each contributing district's management practices. Regional water quality objectives can then be evaluated to develop optimal practices for each district.

The evaluation system may also use GIS data layers as the visual objects that a user accesses to input data, run the model, view results, and so on. For example, a district map showing the SOUs may be displayed. A user can select each SOU to open windows, add data, see results, and perform other tasks for the SOU. Drains, pumps, wells, and other water system components are linked so that the dynamic object is in turn linked to a GIS data layer feature.

The evaluation system may also provide a standardized model for use by multiple parties who all participate in a common water transfer program. The evaluation system may allow for parameters on water transfer costs and revenue to be specified so that the optimization module can determine the optimal supply practices that in turn provide maximum water transfer potential. The evaluation system may provide modules for irrigation deficit modeling, that is, trying to define appropriate times when one should irrigate based on crop yields.

The evaluation system may provide the capability to exchange data with other applications through ODBC, DDE, and OLE. The model could be linked to other water flow modeling applications such as QUAL-2E for water quality, MODFLOW for groundwater modeling, and a single common GIS platform such as ARCMAP.

The evaluation system can be used to develop strategies for water supply optimization for various water usages such as municipal (e.g., use in homes and businesses, and interbasin transfer), industrial (e.g., water consumed during manufacturing processes), power (e.g., cooling towers and other in-plant uses), and agriculture/irrigation (e.g., crops, golf courses, and livestock).

The evaluation system may be provided on a web-based platform for remote user access. A user who has a developed model can access it via a secure web site to run simulations, modify inputs, and view results remotely from their local office computers. A web-based platform allows users to utilize the model without having to maintain programs and data sets or purchase redundant software licenses.

The evaluation system may allow for synthetic rainfall to be generated and applied as a net evapotranspiration time series to simulate possible future conditions. Rainfall can be simulated by random distribution, and Monte Carlo analysis can aid the operator's decision making.

The evaluation system may allow calculation of safe yield from reservoirs and also aid in selecting the capacity and placement of these reservoirs within a water region.

The evaluation system may allow water usage gaming options that will allow various users to evaluate whether to transfer their water rights to others for greater financial returns.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computer system for evaluating water usage within a region, the method comprising:
    providing a description of system operating units within the region, each system operating unit having a water demand that includes amount of water used per time period, the water demand being described by a mathematical model;
    providing a description of water system components within the region, each water system component being described by a mathematical model, at least one water system component being a water source;
    providing a description of connections between the system operating units and the water system components, each connection being described by a mathematical model; and
    analyzing the mathematical models to identify an amount of water needed from each water source for each time period to satisfy the water demands of the system operating units.

2. The method of claim 1 wherein the descriptions of the system operating units and water system components are provided using a graphical user interface.

3. The method of claim 2 wherein system operating units are represented by icons.

4. The method of claim 2 wherein water system components are represented by icons.

5. The method of claim 2 wherein system operating units are represented by icons interconnected by water system components represented by icons.

6. The method of claim 1 wherein a description of a water demand factors in evapotranspiration, percolation, and runoff of the system operating unit.

7. The method of claim 1 wherein analyzing includes optimizing a criterion of water usage that is subject to various constraints.

8. The method of claim 7 wherein the constraints include that a total amount of water used during a time period is less than or equal to an available amount of water.

9. The method of claim 7 wherein the criterion is represented by an objective function.

10. The method of claim 1 wherein a system operating unit has water system components that include fields.

11. The method of claim 10 wherein the water system components include pumps and wells.

12. The method of claim 10 wherein the water system components include drains.

13. The method of claim 1 wherein a system operating unit includes a rice field.

14. The method of claim 13 wherein a mathematical model of the rice field factors in evapotranspiration, deep percolation, and surface outflows.

15. A computer-readable medium containing instructions for controlling a computer system to model water usage within a region by a method comprising:

provewing a graphical representation of types of water system components, each type of water system component having a model describing its water balance, the model having parameters for customizing the model for an instance of the water system component;

receiving an indication of water system components within the region along with connections between the water system components;

displaying a graphical representation of the water system components along with their connections;

receiving values for the parameters of the models for the water system components; and calculating water demand of the region by calculating the water balance of each water system component within the region based on the models and the connections between the water system components.

16. The computer-readable medium of claim 15 including specifying a criterion and constraints and optimizing the criterion based on varying the parameters while satisfying the constraints.

17. The computer-readable medium of claim 16 wherein the criterion is specified by an objective function.

18. The computer-readable medium of claim 16 wherein a constraint is based on water quality.

19. The computer-readable medium of claim 16 wherein a constraint includes maximum demand on a water supply.

20. The computer-readable medium of claim 15 wherein a water system component includes conveyances of water.

21. The computer-readable medium of claim 15 wherein a water system component includes fields.

22. The computer-readable medium of claim 15 wherein water system components are connected to other water system components.

23. The computer-readable medium of claim 15 wherein a model of a water system component factors in evapotranspiration, percolation, and runoff.

* * * * *